(12) United States Patent
Petrossov et al.

(10) Patent No.: US 11,895,209 B2
(45) Date of Patent: *Feb. 6, 2024

(54) OPTIMIZING NOTIFICATION TRANSMISSION

(71) Applicant: JetSmarter Inc., Fort Lauderdale, FL (US)

(72) Inventors: Sergey Petrossov, Fort Lauderdale, FL (US); Mikhail Kirsanov, Fort Lauderdale, FL (US)

(73) Assignee: JetSmarter Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,592

(22) Filed: Dec. 5, 2022

(65) Prior Publication Data

US 2023/0096545 A1 Mar. 30, 2023

Related U.S. Application Data

(63) Continuation of application No. 17/145,468, filed on Jan. 11, 2021, now Pat. No. 11,522,971, which is a (Continued)

(51) Int. Cl.
*H04L 67/55* (2022.01)
*H04L 67/01* (2022.01)
*H04L 67/52* (2022.01)

(52) U.S. Cl.
CPC .............. *H04L 67/55* (2022.05); *H04L 67/01* (2022.05); *H04L 67/52* (2022.05)

(58) Field of Classification Search
CPC ......... G06Q 10/02; H04L 67/01; H04L 67/52; H04L 67/55
See application file for complete search history.

(56) References Cited

U.S. PATENT DOCUMENTS 8,244,549 B1 * 8/2012 Stener .................... G06Q 10/02
705/6
10,893,114 B2 1/2021 Petrossov et al.
(Continued)

FOREIGN PATENT DOCUMENTS

WO     WO 01/71619     9/2001
WO     WO 2008/120844     10/2008

OTHER PUBLICATIONS

International Search Report and Written Opinion for App. No. PCT/US2019/029896, dated Aug. 6, 2019, 14 pages.
(Continued)

*Primary Examiner* — Gil H. Lee
(74) *Attorney, Agent, or Firm* — Fish & Richardson P.C.

(57) ABSTRACT

Methods, systems, and apparatus, including computer programs encoded on a computer storage medium, that enable clients to claims spots on client-initiated segments. In one aspect, a method includes receiving, from a device of a creator, data specifying a client-initiated segment created by the creator through an interface presented at the device. A determination is made, based on the number of spots being claimed by the creator, that the client-initiated segment includes one or more available spots that are available to be claimed by clients other than the creator. A proper subset of the clients that are transmitted a notification that the client-initiated segment is available is created from a set of clients. For each client in the proper subset of clients, the notification that the client-initiated segment is available is transmitted to the client and the client is enabled to claim a spot on the client-initiated segment.

20 Claims, 13 Drawing Sheets

Related U.S. Application Data continuation of application No. 15/968,431, filed on May 1, 2018, now Pat. No. 10,893,114.

(56) References Cited

U.S. PATENT DOCUMENTS

| | | | |
|---|---|---|---|
| 11,522,971 B2 | 12/2022 | Petrossov et al. | |
| 2003/0055689 A1* | 3/2003 | Block | G06Q 10/02 705/13 |
| 2006/0020496 A1 | 1/2006 | Azzarello et al. | |
| 2009/0119135 A1 | 5/2009 | Schoeman et al. | |
| 2009/0198624 A1* | 8/2009 | Eagle, III | G06Q 10/10 705/26.1 |
| 2009/0258656 A1* | 10/2009 | Wang | H04W 4/02 455/456.1 |
| 2010/0076795 A1 | 3/2010 | Steir et al. | |
| 2010/0121662 A1 | 5/2010 | Becker | |
| 2011/0166898 A1 | 7/2011 | Zarrow | |
| 2012/0209636 A1 | 8/2012 | Sloan et al. | |
| 2014/0278612 A1 | 9/2014 | Carnahan | |
| 2015/0120344 A1 | 4/2015 | Rose | |
| 2015/0237470 A1* | 8/2015 | Mayor | G01C 21/3484 455/456.2 |
| 2017/0032682 A1 | 2/2017 | Moser | |
| 2017/0124489 A1 | 5/2017 | Leavitt et al. | |

OTHER PUBLICATIONS

International Preliminary Report on Patentability for App. No. PCT/US2019/029896, dated Nov. 3, 2020, 9 pages.

* cited by examiner

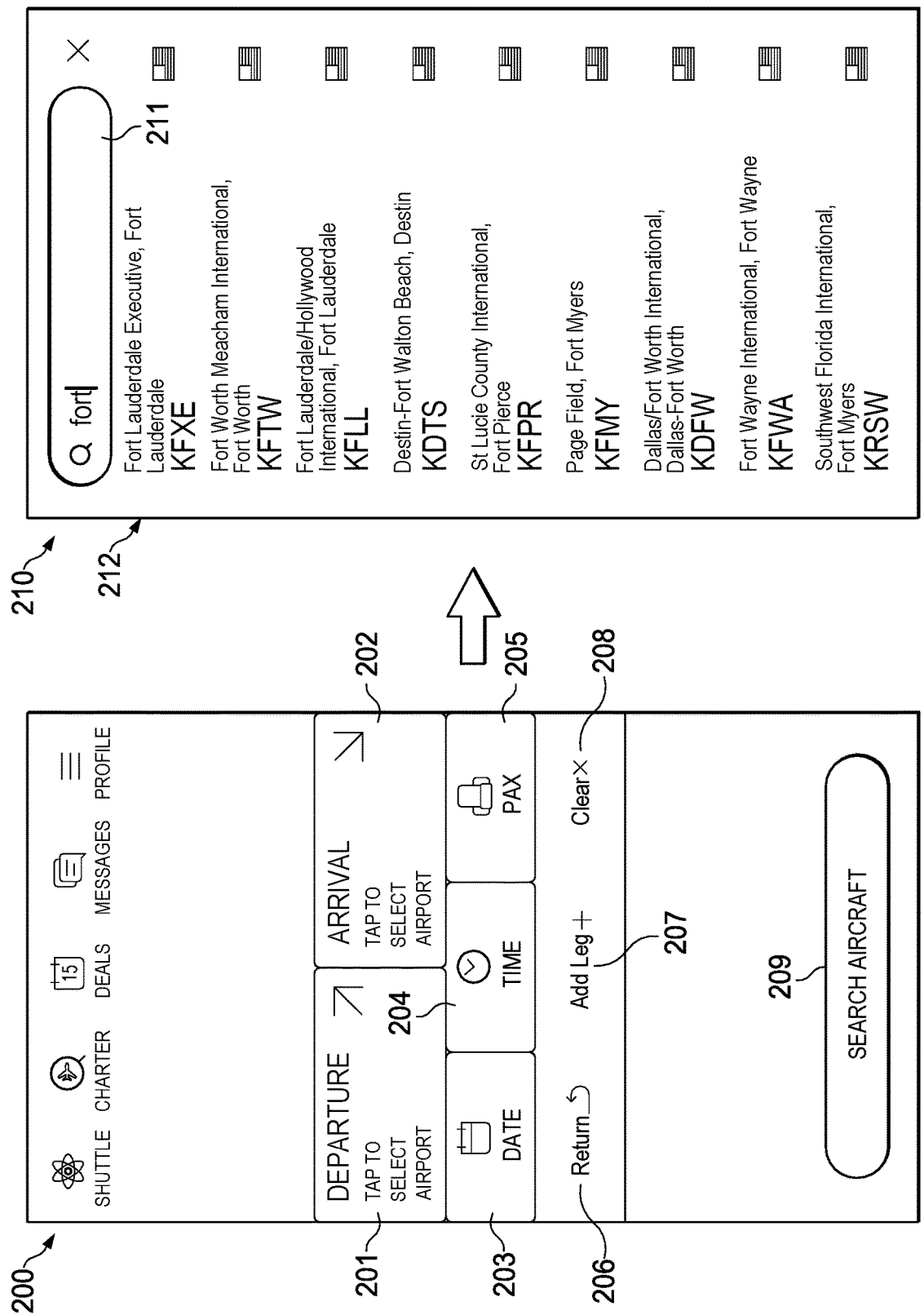

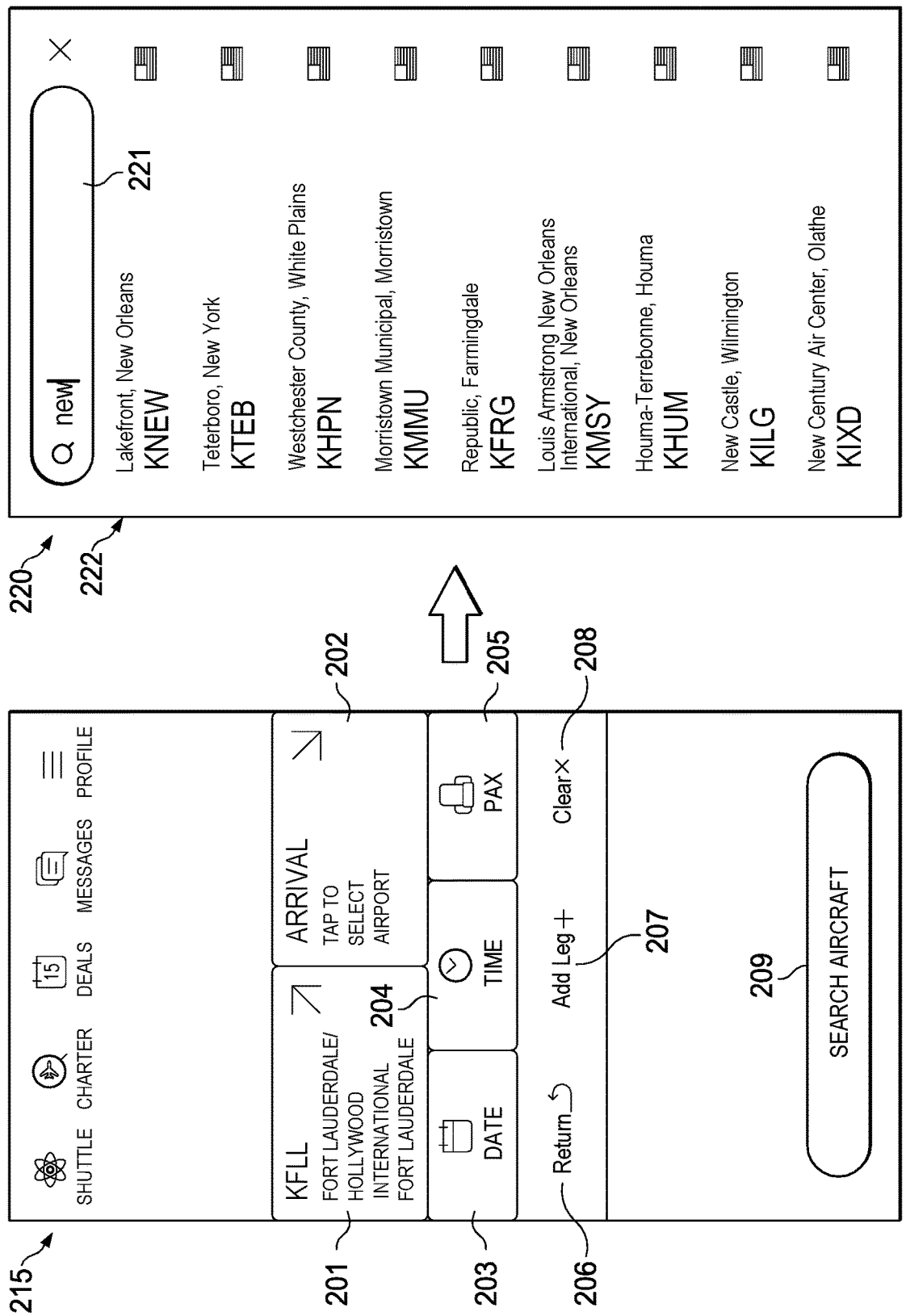

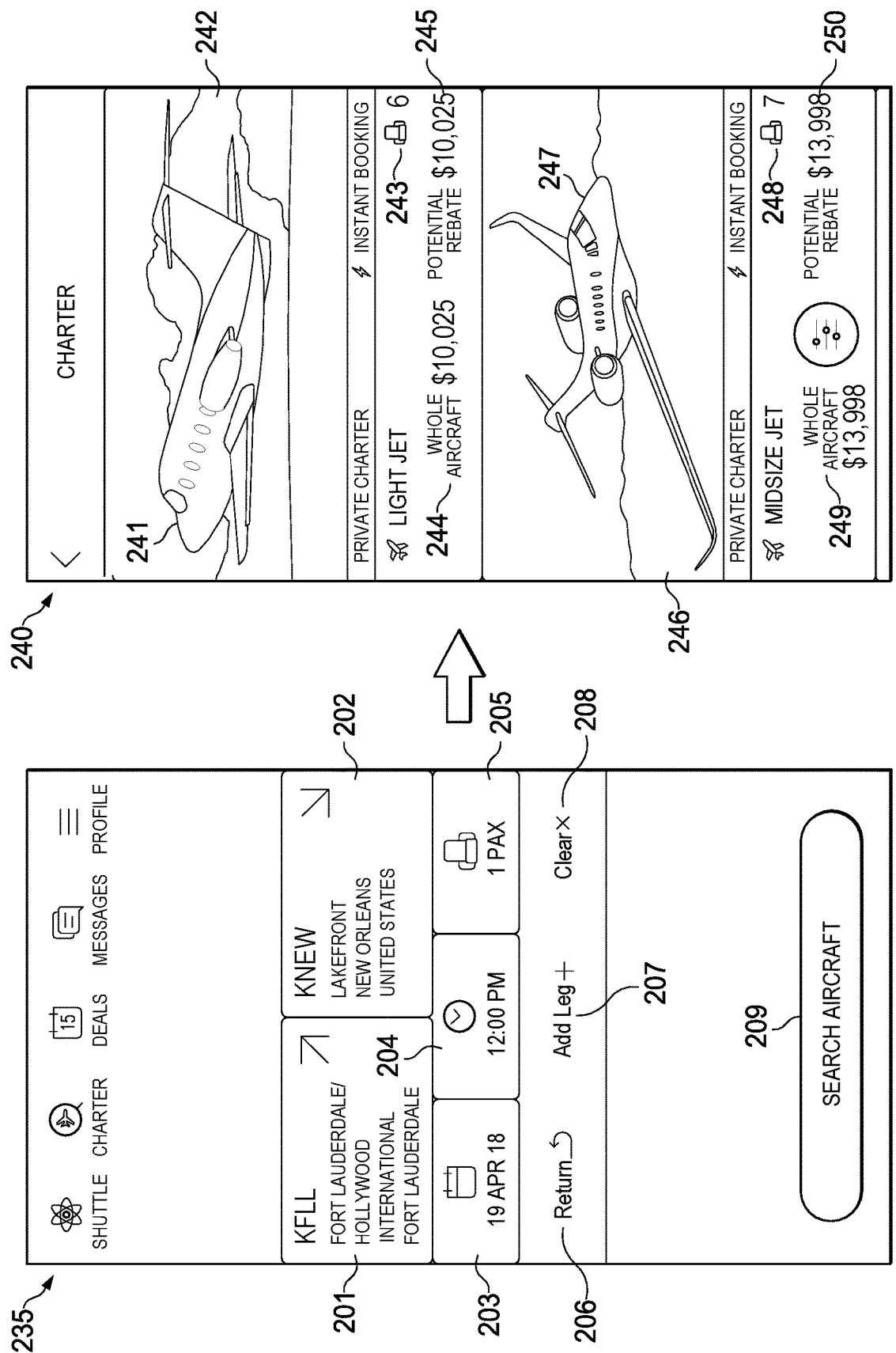

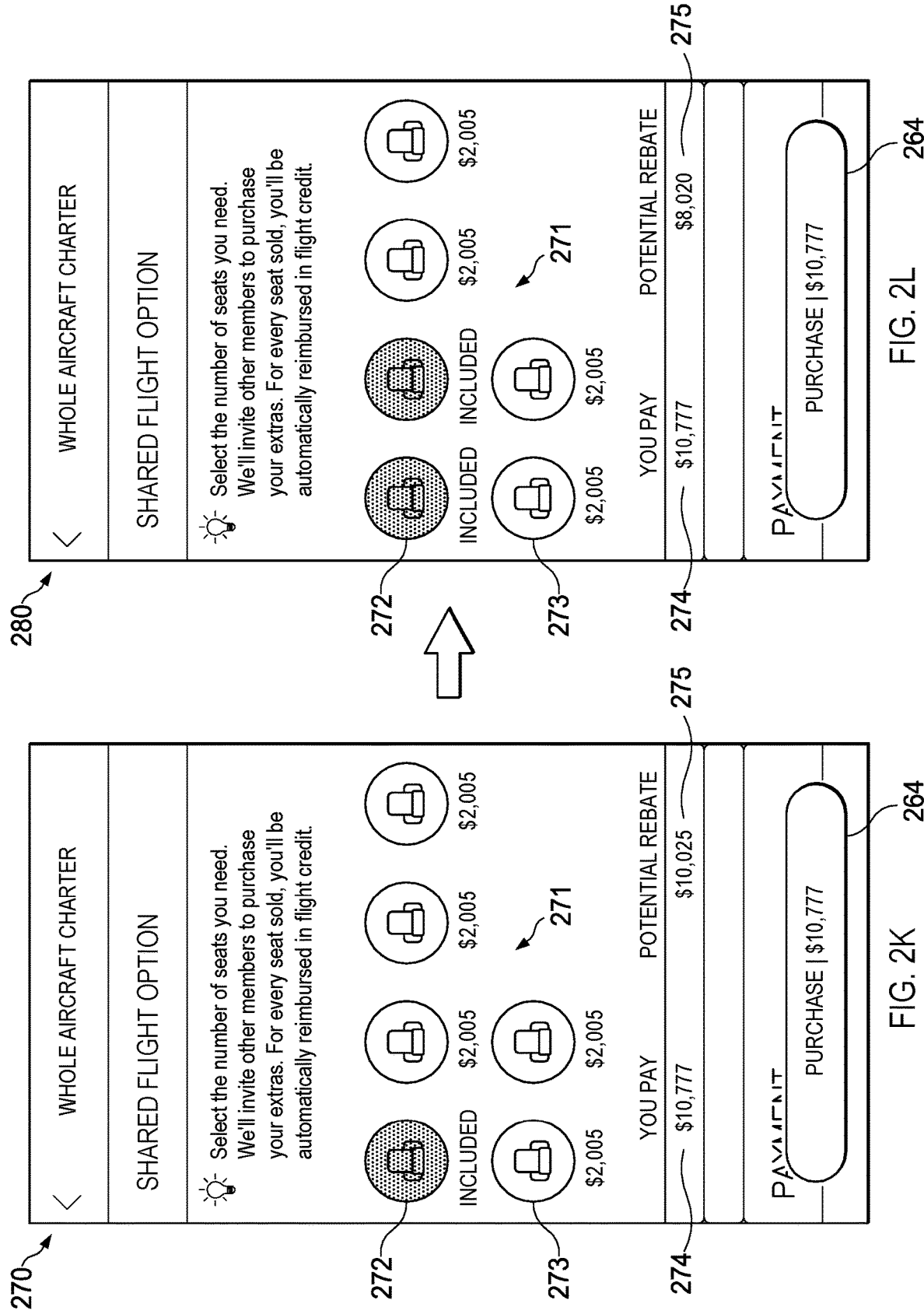

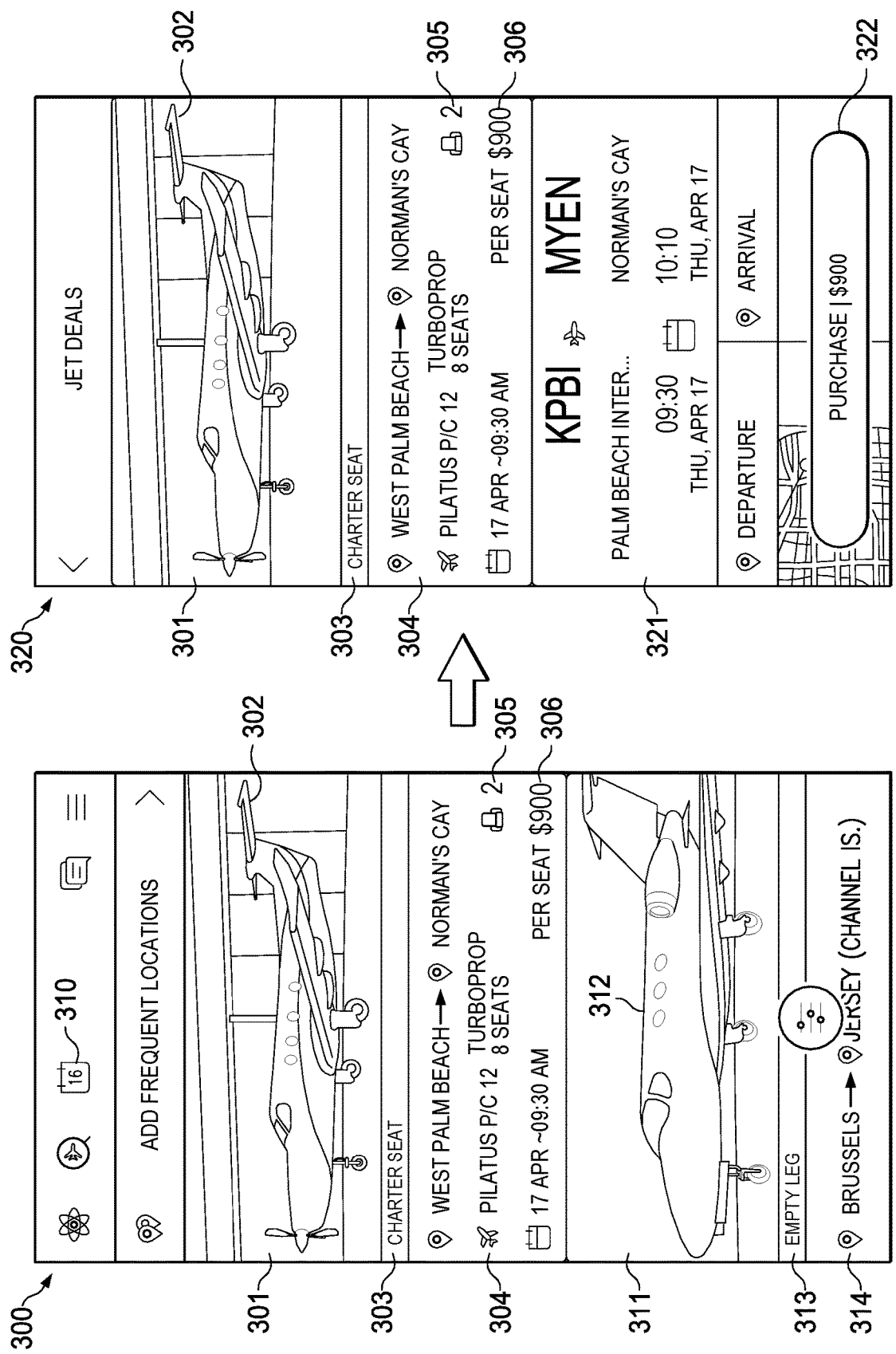

OPTIMIZING NOTIFICATION TRANSMISSION

RELATED APPLICATIONS

This application is a continuation application of, and claims priority to, U.S. patent application Ser. No. 17/145,468, titled "Optimizing Notification Transmission," filed on Jan. 11, 2021, which is a continuation of U.S. patent application Ser. No. 15/968,431, titled "Optimizing Notification Transmission," filed on May 1, 2018. The entire content of the foregoing application is incorporated herein by reference in its entirety for all purposes.

BACKGROUND

This specification relates to a computing platform that notifies clients of client-initiated segments and enables the clients to claim spots on the segments.

Historically, options for traveling between an origin and a destination have been limited to commercial public options in which individual spots (e.g., seats) are acquired by anyone and private options in which all spots in an aircraft or other mode of transport are acquired together by an individual.

SUMMARY

In general, one innovative aspect of the subject matter described in this specification can be embodied in systems that include one or more front-end servers that interact, over a data communication network, with devices of creators and one or more back-end servers in data communication with the one or more front-end servers and that include one or more data processors. The one or more front-end servers or the one or more back-end servers can be configured to perform operations that include receiving, from a device of a creator, data specifying a client-initiated segment created by the creator through an interface presented at the device, the data including at least a departure geographic identifier, a destination geographic identifier, and a number of spots being claimed by the creator; determining, based on the number of spots being claimed by the creator, that the client-initiated segment includes one or more available spots that are available to be claimed by clients other than the creator; creating, from a set of clients, a proper subset of the clients that are transmitted a notification that the client-initiated segment is available, the proper subset being created by including, in the proper subset, each client from the set of clients having a set of one or more geographic identifiers that matches one or more of the departure geographic identifier for the client-initiated segment or the destination geographic identifier for the client-initiated segment; for each client in the proper subset of clients: transmitting, to the client, the notification that the client-initiated segment is available; and enabling the client to claim a spot on the client-initiated segment through a client-side application. Other implementations of this aspect include corresponding apparatus, methods, and computer programs, configured to perform the actions of the methods, encoded on computer storage devices.

These and other embodiments can each optionally include one or more of the following features. In some aspects, creating, from a set of clients, a proper subset of the clients that are transmitted a notification that the client-initiated segment is available, can include identifying, for a given client, a set of one or more client-specified location identifiers specified by the client as frequent locations for the client and determining that at least one of the one or more client-specified location identifiers corresponds to a geographic location that is (i) within a threshold distance of a geographic location corresponding to the departure geographic identifier or (ii) within the threshold distance of a geographic location corresponding to the destination geographic identifier and, in response, including the given client in the proper subset of clients.

In some aspects, creating, from a set of clients, a proper subset of the clients that are transmitted a notification that the client-initiated segment is available, can include identifying, for a given client, a set of one or more home location identifiers for the client and determining that at least one of the one or more home location identifiers corresponds to a geographic location that is (i) within a threshold distance of a geographic location corresponding to the departure geographic identifier or (ii) within the threshold distance of a geographic location corresponding to the destination geographic identifier and, in response, including the given client in the proper subset of clients. Identifying, for a given client, a set of one or more home location identifiers for the client can include identifying, using location data provided by a device of the given client, geographic areas at which the given client spent time, determining, for each geographic area at which the given client spent time, a respective percentage of time the client spent in the geographic area, and, for each geographic area for which the respective percentage of time satisfies a percentage of time, classifying a location identifier for the geographic area as a home location identifier for the given client.

In some aspects, creating, from a set of clients, a proper subset of the clients that are transmitted a notification that the client-initiated segment is available, can include determining a number of times a given client has selected to view segment information for one or more routes that include at least one of the departure geographic identifier for the client-initiated segment or the destination geographic identifier for the client-initiated segment, determining that the number of times satisfies a threshold, and in response to determining that the number of times satisfies the threshold, including the given client in the proper subset of clients.

In some aspects, creating, from a set of clients, a proper subset of the clients that are transmitted a notification that the client-initiated segment is available, can include determining a number of times a given client has searched for information for one or more routes that include at least one of the departure geographic identifier for the client-initiated segment or the destination geographic identifier for the client-initiated segment, determining that the number of times satisfies a threshold, and, in response to determining that the number of times satisfies the threshold, including the given client in the proper subset of clients.

In some aspects, creating, from a set of clients, a proper subset of the clients that are transmitted a notification that the client-initiated segment is available, can include determining a number of times a given client has claimed a spot on a segment between a first geographic location that corresponds to the departure geographic identifier and a second geographic location that corresponds to the destination geographic identifier, determining that the number of times satisfies a threshold, and in response to determining that the number of times satisfies the threshold, including the given client in the proper subset of clients.

Particular embodiments of the subject matter described in this specification can be implemented so as to realize one or more of the following advantages. Enabling clients to create shared segments (e.g., shared charter segments) gives clients flexibility in scheduling segments between locations freely specified by the client rather than selecting from a pre-specified set of locations specified by a segment service provider while not necessarily being responsible for the entire segment. For example, the client that created the shared segment (e.g., the creator of the shared segment) can release spots on the segment for other clients to claim a spot. Other clients can claim a spot, for example, by providing a required submission (e.g., a required amount of money, service provider credit, renewable tokens, or other appropriate items). When the system obtains the required submission from another client (e.g., a client different from the creator), a portion of the total required submission provided by the creator upon creation of the shared segment can be credited back to the creator. This also results in an increased quantity of possible segments on which other clients can claim a spot, resulting in more flexibility and more options not only for the creator but also for the other clients.

A robust computing platform that connects client devices to real time data about shared segments increases the likelihood that other clients will claim a spot on the shared segment, which increases the likelihood that the creator will receive credits for the released spots. For example, sending push notifications to clients that are likely to claim a spot on a shared segment increases the likelihood that a client will claim a spot on the shared segment.

Notifications can be presented such that clients can claim a spot on a shared segment efficiently and without having to navigate to multiple interfaces to find a segment and claim a spot on the segment. For example, a notification can include a summary of information about a segment and code (e.g., an active link) that, when interacted with by a client, launches a native application on the client's device (e.g., mobile or tablet device, and/or navigates the client directly to an interface of the application that enables the client to claim a spot on the segment. Thus, the notification provides the client direct access to the specific interface that enables the client to claim a spot on that shared segment rather than requiring the client to perform multiple steps such as launching the application, performing a search for available segments of interest, and/or navigating multiple different interfaces before arriving at the interface that enables the client to claim a spot on that specific shared segment. In this way, the notifications provide a streamlined user experience and improve the user experience with the application.

Selectively providing notifications for shared segments only to clients that are likely to claim a spot on the segment can improve the functioning of computers and network devices used to transmit the notifications and present the notifications. For example, this reduces the number of notifications transmitted which, when aggregated over many clients, can significantly reduce the processing power and network bandwidth consumed by the notification process. In addition, this reduces the number of notifications a given client receives, which reduces the burden on memory resources of the given client's device and improves the user's experience by reducing the number of notifications presented to the given client. This also allows the user to more efficiently find notifications for segments that the client has interest in without being required to review many irrelevant notifications for segments in which the client has no interest.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2L are screenshots of example graphical interfaces for creating a shared segment.

FIGS. 3A-3C are screenshots of example graphical interfaces for claiming a spot on a shared segment.

Like reference numbers and designations in the various drawings indicate like elements.

DETAILED DESCRIPTION

Figure 1:
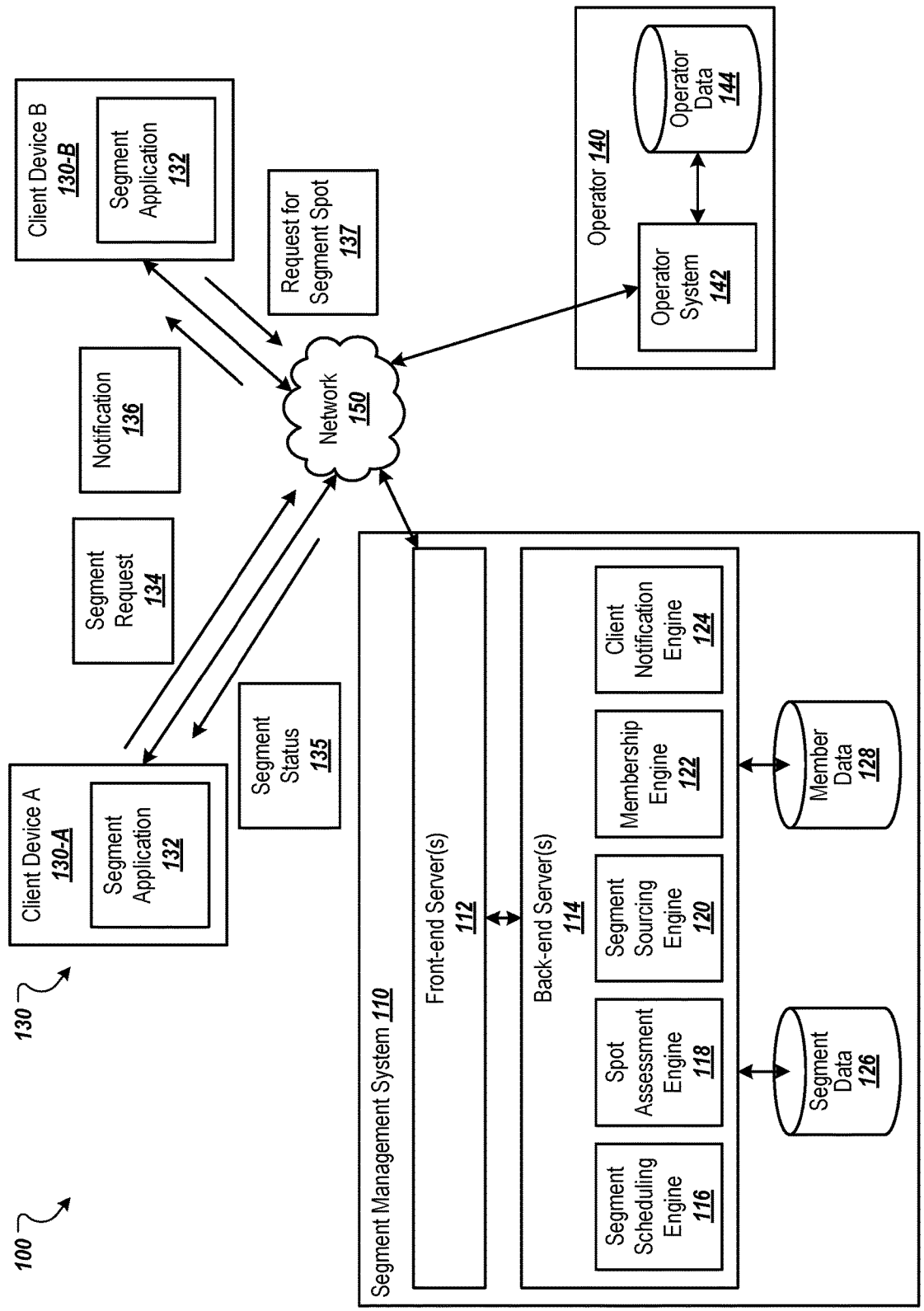
FIG. 1 is a block diagram of an example environment in which a segment management system enables clients to initiate segments, including custom shared segments.

This document describes methods, systems, devices and computer readable medium that facilitate creation of client-initiated segments. As used throughout this document, a segment refers to a flight (or other mode of navigation) between an origin and a destination. The term segment refers to any type of flight that carries clients, including shuttles (e.g., a flight between a set of locations specified by the service provider) and charters (e.g., a flight between two locations freely specified by a client).

As described in detail below, the segment can be initiated by a client (e.g., a member of a service and/or a user of an application that facilitates creation of the segment), and made available to other clients, for example, by way of a native mobile application (or another appropriate interactive environment, such as a web interface). A client of the service (rather than the service provider itself) that initiates a segment is referred to herein as a creator. An example creator is a client that initiates (and customizes by specifying attributes for) a segment (e.g., a flight) over a specified route. A spot refers to seat or other appropriate area of occupancy for a client on a jet that is used for the segment.

There are multiple different types of segments that can be initiated by a client. Two types of segments are shuttles and charters. A client can initiate a shuttle by selecting a route from a pre-specified set of routes between two locations (e.g., as specified by a provider of the service). A client can initiate a charter by freely specifying both the origin and destination for the charter rather than selecting from the pre-specified set of routes. The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity.

A shared charter segment is a charter segment on which other clients can claim a spot. Typically, a charter segment is a private segment booked for the private use of an individual or group. Techniques described herein enable a client to create a private segment (e.g., a private charter segment) and convert the private segment to a shared segment (e.g., a shared charter segment) to allow other clients, also referred to as finders, to claim a spot on the shared segment. This is an unconventional way of creating available spots on aircraft that requires new interfaces and the generation of new data.

For example, a client may want to create a segment on a route for which a segment service provider does not provide scheduled shuttles. However, the client may not need the entire jet and may prefer to receive a credit (e.g., a flight credit or rebate) for allowing other clients to occupy a spot on the jet. If the client creates a private charter segment and converts the private charter segment to a shared charter segment, the segment service provider can notify other clients about the availability of the shared charter segment and enable the clients to claim a spot on the shared charter segment. This provides new opportunities for the other clients to travel from the origin of the shared charter segment to the destination of the shared charter segment that otherwise would not have been available.

For each spot claimed by a client (e.g., a finder) on a shared segment, the segment service provider can provide a credit to the client that created the shared segment. This helps the creator to offset a required submission that is required by the segment service provide to create the segment (e.g., the cost of using the entire jet). Without the credits, the creator may be unwilling to create the shared segment, which would reduce the quantity of segments for other clients that may have claimed a spot on the segment.

The segment provider can select clients to notify about the availability of a client-initiated segment (e.g., a shared charter segment) and enable the clients to claim a spot on the client-initiated segment. For example, rather than notify all clients of the service about each client-initiated segment, the segment service provider can select a subset of the clients to provide the notification. The segment service provider can select the clients for a given client-initiated segment based one or more factors, such as, for each client, a set of client-specified location identifiers specified by the clients as frequent locations for which the client requests to receive frequent notifications, locations that the client has spent at least a threshold amount of continuous time, the number of times the client has selected to view segment information for (or searched for) routes that have a same geographic identifier as the client-initiated segment, the number of times the client has claimed a spot on a segment between the same origin and destination as the client-initiated segment, and/or other appropriate factors.

Although the description below and some of screenshots illustrated in FIGS. 2A-#C refer often to shared charters, the techniques described below and the interfaces illustrated in the screenshots can be used for other types of shared segments.

FIG. 1 is a block diagram of an example environment 100 in which a segment management system 110 enables clients to initiate segments, including private segments and shared segments. The example environment 100 includes a network 150, such as a local area network (LAN), a wide area network (WAN), the Internet, a mobile network, or a combination thereof. The network 150 connects client devices 130 (e.g., client device A 130-A and client device B 130-B) of clients, the segment management system 110, and operator systems 142 of operators 140. The example environment 100 may include many different client devices 130 and operators 140.

The segment management system 110, which can be operated and maintained by the segment service provider, allows clients to arrange transportation on segments provided by the segment service provider. The segment service provider can provide scheduled segments (e.g., scheduled shuttles) between origins and destinations using a client membership model in which clients (e.g., members of the segment service provided by the segment service provider) provide a membership submission to be eligible to claim spots on the segments.

The segment service provider can also enable the clients to initiate segments with custom attributes (e.g., custom departure date, origin, destination, and/or type of jet). For example, the segment service provider can enable the clients to initiate custom shuttles between locations specified by the segment service provider (e.g., along routes for which the segment service provider provides scheduled segments). The segment service provider can also enable the clients to initiate charters (e.g., private and/or shared) between locations freely specified by the client (e.g., along routes that the segment service provider does not provider scheduled segments).

A client can initiate and manage segments, claim a spot on a segment, manage other travel arrangements with the segment management system 110, manage their profile, and/or perform other appropriate tasks related to the segment management system 110 using a client-side segment application 132 executed on the client device 130 of the client. The segment application 132 can transmit data to, and receive data from, the segment management system 110 over the network 150. The segment application 132 can be implemented as a native application developed for a particular platform or a particular device, web browser that provides a web interface, or another appropriate type of application. The segment application 132 can be executed by the client device 130. The segment application 132 can present and detect user interactions with various interfaces that allow the client to initiate segments, segments, and/or claim a spot on segments. Some example interfaces generated and presented by the segment application 132 are illustrated in FIGS. 2A-3C and described below.

A client device 130 is an electronic device that is capable of requesting and receiving resources over the network 150. Example client devices 130 include personal computers, mobile communication devices (e.g., Smartphones), tablet devices, and other devices that can send and receive data over the network 150. A client device 130 typically includes a user application, such as a web browser or native application, to facilitate the sending and receiving of data over the network 150. The description that follows refers to a client device that interacts with the segment management system 110 using a native application, but the description that follows is equally applicable to interactions with web pages and/or other web-based resources.

The segment management system 110 includes one or more front-end servers 112 and one or more back-end servers 114. The front-end servers 112 can transmit data to, and receive data from the client devices 130, e.g., client device A 130-A and client device B 130-B, and operator systems 142 of operators 140 over the network 150. For example, the front-end servers 112 can provide, to the segment application 132 of a client device 130 of a client, interfaces or data for presentation with the interfaces. The front-end servers 112 can also receive data specifying interactions with the interfaces of the segment application 132, such as attributes of a segment initiated by the client. As described in more detail below, the front-end servers 112 can update the interfaces, provide new interfaces, and/or update the data presented by the interfaces based on user interactions with the segment application 132.

The front-end servers 112 can also communicate with the back-end servers 114. For example, the front-end servers 112 can identify data that is to be processed by the back-end servers 114, e.g., data specifying attributes of a client-initiated segment, and provide the data to the back-end servers 114. The front-end servers 112 can also receive, from the back-end servers 114, data for a particular client and transmit the data to the client device 130 of the particular client over the network 150.

The back-end servers 114 include a segment scheduling engine 116, a spot assessment engine 118, a segment sourcing engine 120, a membership engine 122, and a client notification engine 124. As used herein, the term engine refers to one or more data processing apparatus that perform a set of tasks. The segment scheduling engine 116 manages the creation, confirmation, and/or cancellation of segments, including shared segments. The segment scheduling engine 116 can receive data specifying attributes of a segment initiated by a client and create the segment within the segment management system 110. For example, a client that uses a client device A 130-A can interact with interfaces of the segment application 132 to initiate a private segment (e.g., a private charter segment) and specify attributes of the private segment. The attributes can include a departure geographic identifier (e.g., an origin city or airport code), a destination geographic identifier (e.g., a destination city or airport code), a departure date (which can include a date and/or time) at which the segment will depart from the origin, a type of jet (e.g., light, midsize, heavy, propeller, rotorcraft, etc.), a number of spots being claimed by the client, and/or other appropriate attributes.

The application 132 can generate a segment request 134 and cause the client device A 130-A to transmit the segment request 134 to the segment management system 110 over the network 150. The segment request 134 can include one or more of the client-specified attributes. In some implementations, the segment request 134 can include all of the attributes. For example, the application 132 can cause the client device A 130-A to transmit the segment request 134 after all of the appropriate attributes have been obtained from the client. As described in more detail below, the application 132 can prompt the client for the attributes using multiple interfaces.

In some implementations, the segment request 134 includes only a portion of the attributes (e.g., less than all of the attributes required by the segment service provider). For example, the segment scheduling engine 116 can cause the application 132 to prompt the client for additional attributes or other information based on initial attributes received in the segment request 134. In a particular example, the segment request 134 can include the departure geographic identifier, destination geographic identifier, and departure date. The segment scheduling engine 116 can receive these attributes, identify what types of jets are available for travel from the origin to the destination, and provide data specifying the available types of jets to the client device A 130-A for presentation by the application 132 to the client. The client can then select from the available types of jets and the application 132 can cause the client device A to transmit data specifying the selected type of jet to the segment management system 110.

The application 132 can enable the client to convert the private segment to a shared segment (e.g., a shared charter segment) on which other clients can claim a spot. For example, when a client creates a segment, the application 132 can present an interface control that allows the client to specify whether the segment should be a private segment or a shared segment. In another example, the application 132 can enable the client to create and specify attributes of a private segment and then present an interface control that enables the client to convert the private segment to a shared segment. The application 132 can detect user interaction with the user interface control, determine the type of segment indicated by the user interaction, and provide the data to the segment management system 110.

The segment scheduling engine 116 can receive the data and create the appropriate type of segment within the segment management system 110 based on the data and the attributes received from the client device A 130-A. The segment scheduling engine 116 can also store the data for the created segment in a segment data storage unit 126. The segment data storage unit 126 can include one or more databases (or other appropriate data storage structures) stored in one or more non-transitory data storage media (e.g., hard drive(s), flash memory, etc.).

The segment data storage unit 126 can store data for each segment that is provided by the segment service provider. For example, the segment data storage unit 126 can store data for each scheduled and each client-initiated segment. The segment data storage unit 126 can store data for previously operated segments, segments scheduled by the segment service provider that have not yet departed, and/or client-initiated segments that have not yet departed.

In some implementations, the stored data can include, for each segment, one or more of a type of aircraft selected for the segment, a departure date and/or time for the segment, geographic identifiers for the origin and destination of the segment, a number of spots on the segment, a number of spots claimed on the segment, the operator that will provide the selected aircraft, a required submission provided by clients to claim a spot on the segment, whether the segment is a scheduled segment that was scheduled by the segment service provider or a client-initiated segment, identifiers for each client that claimed a spot on the segment, identifiers for clients (and a number of clients) that actually boarded the segment if the segment has departed, and/or other appropriate data about the segment. For client-initiated segments, the data can also include an identifier of the client that created the segment, whether the segment is a shuttle, a private segment (e.g., a private charter segment), or a shared segment (e.g., a shared charter segment), and/or other appropriate data for client-initiated segments.

The client notification engine 124 can notify other clients of the client-initiated segment created in the segment management system 110. In some implementations, clients can view the various segments from an origin to a destination. For example, the segment application 132 can present segments from an origin to a destination using a calendar interface. The calendar interface can include, for each date, zero or more segment indicators for each segment scheduled to travel from the origin to the destination on that date. For example, each segment indicator may be a dot under the date in the calendar. In this example, after the segment is created, a segment indicator will be presented under the departure date for the segment to represent the created segment. If a different client is viewing the calendar interface for flights from the same origin and to the same destination as the created segment, the client can see the dot for the created segment and interact with the dot or the date (e.g., by selecting the dot or the date) to view more information about the created segment and/or claim a spot on the created segment.

In some implementations, the client notification engine 124 notifies clients using push segment notifications 136. For example, the client notification engine 124 can send messages (e.g., within the application 132, via text messaging, and/or via e-mail) to the clients to notify the clients of the created segment. The messages can include code (e.g., an active link) that navigates directly to an application page within the application 132 (or to a web page in a web interface) to claim a spot on the segment. The segment application 132 can present notifications for segments using a dedicated interface. For example, the client can view notifications for segments by navigating to the interface. The notification can cause the client device 130 to present visual information (e.g., information about the segment), generate audio information (e.g., a sound that alerts the client), and/or create a tactile sensation (e.g., a vibration of the client device 130).

Figure 7:
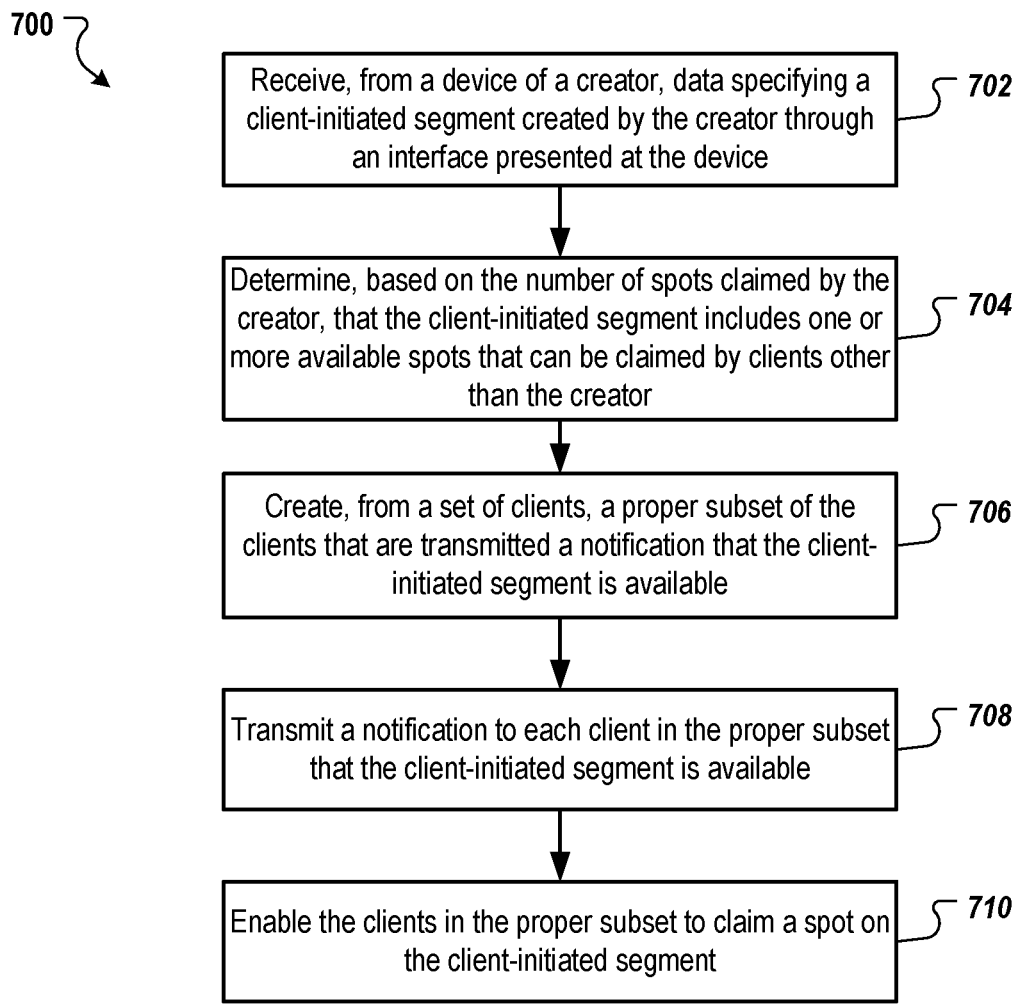
FIG. 7 is a flow chart of an example process for notifying clients of a client-initiated segment and enabling the clients to claim a spot on the client-initiated segment.

In some implementations, the client notification engine 124 transmits the notifications 136 to clients that are likely to be interested in the created segment, e.g., based on previous segments on which the clients were passengers, the location of the clients, and/or frequent locations specified by the clients (e.g., using the application 132). An example process for selecting clients to transmit a notification for a client-initiated segment and for transmitting the notifications to the clients is illustrated in FIG. 7 and described below.

In some implementations, a creator can specify, as an attribute of a client-initiated segment, a condition that restricts which other clients are qualified to be notified about the client-initiated segment. For example, the creator can specify an allergy to a particular type of animal. In this example, clients that bring an animal on segments may not be qualified to be notified of the client-initiated segment. Only clients that meet the condition may be notified. In other words, the selection of which clients are notified can be performed using a filtering function that filters out clients that are not eligible to be notified based on one or more criteria, such as the client opting out from notifications, the client opting out from certain types of notifications, the client having a characteristic that results in the client not meeting the condition, or other appropriate criteria. This filtering function helps to reduce the processing required and/or bandwidth utilized in distributing notifications, for example, by reducing the number of notifications that are transmitted for any particular segment.

A client, e.g., the client associated with (e.g., logged into the application 132 on) the client device B 130-B, can request a spot on a client-initiated segment using the application 132. For example, the client can interact with a segment indicator for the segment in a calendar interface (e.g., for client-initiated shuttles), select a link in a push notification (e.g., for client-initiated shared charter segments), or another appropriate way. The application 132 can then generate a request for a segment spot 137 and transmit the request for the segment spot 137 to the segment management system 110. The request for the segment spot 137 can include data specifying the client that submitted the request and an identifier of the segment on which the client is requesting a spot.

The segment scheduling engine 116 can receive the request for the segment spot 137 and determine whether there is still a spot available on the segment. For example, there may not be a spot available if other clients have claimed all of the available spots. If there is still a spot available on the segment, the segment scheduling engine 116 can add the client that submitted the request for the segment spot 137 to the segment. If not, the segment scheduling engine 116 can send a notification to the client that the segment is no longer available, e.g., on an interface of the application 132.

If a client claims a spot on a shared segment, the segment scheduling engine 116 can provide a credit to the creator of the shared segment. The credit can be in the form of flight credit (e.g., amounts that can be applied to the cost of future segments on which the creator joins or future segments that the creator creates), a refund, a discount, a reward (e.g., complementary future flight or upgrade to higher class jet), or other appropriate type of credit.

A shared segment can have a total potential amount of credit obtainable by the creator for remaining spots on the shared segment not claimed by the creator. The total potential amount of credit for a shared segment can be based on (e.g., equal to or directly proportional to) an amount required by the segment service provide for creating the shared segment.

The amount of credit for each individual spot can be based on the total potential amount of credit obtainable by the creator for the remaining spots and the total number of spots on the shared segment. For example, the amount of credit for a spot can be equal to the total potential amount of credit obtainable divided by the total number of spots. In another example, the amount of credit for a spot can be based on the total potential amount of credit obtainable divided by the total number of spots minus one spot for the creator. In this example, assume the total potential amount of credit obtainable is 10,000 and there are six spots on the shared segment. The amount of credit for each spot claimed by another client would be 2,000 (e.g., 10,000/5). In yet another example, the amount of credit for a spot can be equal to the total potential amount of credit obtainable divided by the number of spots made available to other clients (e.g., that were not claimed by the creator).

The segment scheduling engine 116 can provide segment status notifications 135 to the client that created the segment (i.e., the creator) and/or the clients that claimed a spot on the segment. For example, if the segment is a shared segment, the segment scheduling engine 116 can notify the creator when other clients claim a spot on the shared segment.

The spot assessment engine 118 can determine the total required submission that must be submitted by a creator to create each segment and/or the required submission that clients are required to submit for each spot on a segment. As used throughout this document, the phrase "required submission" refers to any item submitted by a client to claim a spot on a segment. Examples of required submissions include a required amount of money, service provider credit, renewable tokens, or other appropriate items. A different required submission can be specified for each spot on a segment, and the total required submission for a segment can refer to the total amount required by the creator of the segment at the time of segment creation.

The required submission that must be submitted by the creator and/or the required submission that must be submitted by a client for each spot can be based on various factors, such as the type of jet, the departure and destination geographic identifiers, the departure date, the duration of time between the time the segment is initiated and the departure date, the type of segment (e.g., shuttle or charter), data stored in the segment data storage unit 126, and/or other appropriate factors.

The segment sourcing engine 120 can interact with the operator systems 142 of the operators 140 to select jets for the segments and obtain information about the jets (e.g., number of spots on the jet, amounts for particular segments, range, flight time rates, etc.). For example, when the segment scheduling engine 116 creates a segment (e.g., a service provider scheduled segment or a client-initiated segment), the segment sourcing engine 120 can interact with the operator systems 142 to identify a jet of the same type as the created segment that can be used for the segment. For example, the segment sourcing engine 120 can submit a request to each operator system 142 for a jet of the type of the created segment. In response to receiving a request, the operator systems 142 can obtain data regarding available jets from their respective operator segment data storage units 144 and provide, to the segment sourcing engine 120, the information about any available jets that the operator 140 is willing to operate for the created segment (e.g., number of spots on the jet, rates for particular segments, range, etc.). If multiple operators 140 have an available jet, the segment sourcing engine 120 can select a jet for the created segment based on the information provided by the operator systems 142.

In some implementations, the front-end servers 112 of the segment management system 110 communicate with the operators systems 142 using application programming interfaces (APIs). The use of the APIs require computational power to communicate data. To reduce the amount of computational power used by the APIs, the segment management system 110 may identify a subset (e.g., less than all) of operators 140 for a particular segment and provide the request to only the operators in the subset. The segment management system 110 can identify the subset of operators based on the departure geographic identifier (e.g., identify operators that operate jets in the geographic area from which the segment will depart), previous segments provided by the operators (e.g., previously provided a jet for the same origin and destination), types of jets that the operator operates, and/or other appropriate criteria. In some implementations, communications with operators can be carried out using other communications means (e.g., phone). When the segment has been confirmed by the operator, the selected aircraft will be deployed to the origin at an appropriate time so that the selected aircraft will be available for any clients that have obtained spots (e.g., seats) on the created segment.

The membership engine 122 manages the membership of clients of the segment service provider. For example, the membership engine 122 can receive and process requests from potential clients to become members of the segment service provided by the segment service provider. The membership engine 122 can also maintain membership data for each client that becomes a member. The membership data can include a profile for each client. The profile for a client can include the name of the client, contact information for the client (e.g., an address and/or phone number), payment information, and/or other appropriate information related to the client. The profile for a client can also include a geographic identifier (e.g., name of a city, state, region, country, or other geographic identifier) for a primary geographic location for the client. The primary geographic location for the client can be a location of primary residence. For example, a client may have multiple residences, but may be requested to provide a geographic location (e.g., address) for a primary residence.

The membership data for a client can also include data identifying segments on which the client claimed a spot, if the client has claimed a spot on at least one segment. For example, a new client may have not yet claimed a spot or traveled on any segments. The membership data for each client can include, for each route, a number of times the client claimed a spot on a segment on the route.

The membership data for a client can also include a set of one or more geographic identifiers that can be used to determine whether to notify the client of segments (e.g., client-initiated segments). The geographic identifiers can include client-specified location identifiers specified by the client as frequent locations for the client. A frequent location can be a location for which the client wants to receive notifications. For example, the locations may be locations that the client frequents and/or locations that the client wants to visit in the future.

The geographic identifiers for a client can include home location identifiers for the client. The home location identifiers can correspond to geographic areas at which the client has spent at least a threshold percentage of time. For example, the home location identifiers for a client can correspond to geographic areas at which a client spent at least 25% (or another appropriate percentage) of their time. The membership engine 122 can determine, for each client, geographic areas in which the client has spent time. The membership engine 122 can also determine, for each geographic area, an amount of time the client has spent in the geographic area. The membership engine 122 can then determine, for each geographic area, a percentage of the client's time (e.g., over the course of a year or other specified time period) that the client was located in the geographic area. If the percentage of time for a geographic area satisfies the threshold, e.g., by meeting or exceeding the threshold), a home location identifier for the geographic area can be added to the client's membership data.

The client does not have to remain in the exact same location for the time to count towards time spent in a geographic area. Instead, if the client is in multiple different locations within a threshold distance of a particular location within the geographic area, the membership engine 122 can classify the geographic area as a home location for the client.

The membership data for a client can also include, for each segment and/or each route, a number of times the client viewed information for the segment or route. Similarly, the membership data for a client can include, for each segment and/or each route, a number of times the client searched for the segment or route.

The membership engine 124 can store the membership data for each client in a membership data storage unit 128. The membership data storage unit 128 can include one or more databases (or other appropriate data storage structures) stored in one or more non-transitory data storage media (e.g., hard drive(s), flash memory, etc.).

FIGS. 2A-2L are screenshots of example graphical interfaces for creating a shared segment. In the illustrated example, the screenshots illustrated in FIGS. 2A-2L and described below show interfaces for creating a private segment (e.g., a private charter segment) and converting the private segment to a shared segment (e.g., a shared charter segment). In other examples, the interfaces can enable clients to create a shared segment directly, without first creating a private segment. The interfaces can be presented by an application, e.g., the segment application 132 of FIG. 1, executing on a client device, e.g., a client device 130 of FIG. 1.

FIG. 2A is a screenshot of an example segment attribute interface 200 that enables a creator to specify attributes of a client-initiated segment. The segment attribute interface 200 includes a departure selector control 201 that enables the creator to select a departure geographic identifier (e.g., an airport code, city name, or other appropriate identifier) for a departure geographic location (e.g., an airport, city or other appropriate geographic area) for the segment and an arrival selector control 202 that enables the creator to select a destination geographic identifier for a destination geographic location for the segment. For example, the creator can use the departure selector control 201 to specify the departure airport for the segment and use the arrival selector control 201 to specify the destination airport for the segment. Selection of the departure geographic identifier is described below with reference to FIG. 2B and selection of the destination geographic identifier is described below with reference to FIG. 2D.

The segment attribute interface 200 also includes a date selector control 203 that enables the creator to select a departure date for the segment and a time selector control 204 that enables the creator to select a departure time for the segment. Selection of the date for the segment is described below with reference to FIG. 2F. The segment application can detect user interaction with (e.g., selection of) the time selector control 204 and, in response, present an interface or control for selecting the departure time. This interface can be an interactive clock, text/number entry blocks, slider controls, or another appropriate type of time selector control.

The segment attribute interface 200 also includes a number of spots selector control 205 that enables the creator to specify the minimum number of spots that should be available on the jet used for the segment. The segment application can detect user interaction with the number of spots selector control 205 and, in response, present an interface or control for selecting the departure time. This interface can be text/number entry blocks, slider controls, or another appropriate type of time selector control.

The segment attribute interface 200 also includes a return segment selector control 206 that enables the creator to create a return segment, e.g., that returns from the destination of the segment to the origin of the segment. The segment application can detect user interaction with the return segment selector control 206 and, in response, present a return segment attribute interface that enables the creator to specify attributes of the return segment. This interface can be presented below the return segment selector control 206 and include a departure selector control (similar to the departure segment control 201), an arrival selector control (similar to the arrival selector control 202), a date selector control (similar to the date selector control 203), a time selector control (similar to the time selector control 204), and a number of spots selector control (similar to the number of spots selector control 205).

The segment application can include a set of one or more rules or other logic to ensure that the return segment is appropriate or possible. For example, the segment application can prevent the creator from creating a return segment that departs before the primary segment (i.e., the segment being created using the controls 201-205). In this way, the segment application prevents a client from creating a segment that is not feasible.

The segment attribute interface 200 also includes an add a leg selector control 207 that enables a creator to add one or more additional segments to the primary segment. For example, a creator may want to travel from New York to Miami and spend a day in Miami before traveling to Dallas. In this example, the creator can create a primary segment from New York to Miami using the controls 201-205. The creator can select the add a leg selector control to create a segment from Miami to Dallas. The segment application can detect user interaction with the add a leg selector control 207 and, in response, trigger presentation of an added leg attribute interface that enables the creator to specify attributes of the added segment. This interface can be presented below the add a leg selector control 207 and include a departure selector control (similar to the departure segment control 201), an arrival selector control (similar to the arrival selector control 202), a date selector control (similar to the date selector control 203), a time selector control (similar to the time selector control 204), and a number of spots selector control (similar to the number of spots selector control 205).

The segment application can include a set of one or more rules or other logic to ensure that added segment is appropriate or possible. For example, the segment application can prevent the creator from adding a segment that departs before the primary segment and/or that does not include a departure geographic identifier that matches the destination geographic identifier of the previous segment (e.g., the primary segment if there is one added segment).

Return segments and added legs can each be treated as individual segments. For example, notifications can be transmitted to a respective set of clients for each individual segment. Similarly, the amount of credit obtainable for each segment (and for each spot) may differ.

The segment attribute interface 200 also includes a clear control 208 that enable the creator to clear the selections made using the controls 201-205. For example, if the creator wants to start over, the creator can select the clear control 208 and the segment application can clear the creator's previous selections.

The segment attribute interface 200 also includes a search aircraft control 209. If the creator selects the search aircraft control 209, the segment application can search for aircraft that match (or are close to matching) the attributes of the segment(s) received using the controls of the segment attribute interface 200. In this example screenshot, the segment application has deactivated the search aircraft control 209 because the creator has not provided any attributes. After the necessary attributes (e.g., departure geographic identifier, destination geographic identifier, departure time and date, and minimum number of spots) are received, the segment application can activate the search aircraft control 209 to allow the creator to interact with the search aircraft control 209.

If the creator interacts with the departure selector control 201, the segment application can detect the interaction and present the departure location interface 210 of FIG. 2B. The departure location interface 210 includes a text entry box 211 that enables a creator to enter text for a departure geographic location. In this example, the segment application identifies airport codes for airports that correspond to the text entered in the text entry box 211 and presents a list 212 of the airport codes along with information about each airport code (e.g., the city in which the airport is located). For example, the segment application can identify airport codes for airports that include at least a portion of the entered text (or at least a portion of a spell corrected versions of the text) and/or airport codes for airports located in cities, states, or other regions that match at least a portion of the entered text (or at least a portion of a spell corrected versions of the text).

In some implementations, the segment application can order the airport codes in the list 212 based on one or more criteria. In one example, the airport codes can be ordered in the list 212 based on an expected amount (e.g., estimated cost) for segments (e.g., charter segments) that depart from the airport relative to an expected amount for segments that depart from the other airports (e.g., airport codes for cheaper airports may be higher in the list 212 than the airport codes for more expensive airports). In another example, the airport codes can be ordered in the list 212 based on the frequency at which segments provided by the segment service provider depart from the airports (e.g., airport codes for airports from which more segments depart may be higher in the list 212 than airport codes for airports from which fewer segments depart).

The creator can select, from the list 212, an airport code for an airport from which the creator wants the segment to depart. The segment application can detect selection of an airport code and, in response, store data specifying the selected airport code for the segment. If the creator does not find the preferred airport in the list 212, the creator can adjust the text, e.g., by adding more text, deleting text, or replacing text, in the text entry box 211. The segment application can update the list 212 based on the updated text. Although a text entry box 212 is presented in the example departure location interface 210, other interfaces can be used, such as voice input (e.g., the creator speaks the destination and the voice data is converted to text), a map interface in which a user selects the airport from a map, or other appropriate interface.

After a departure airport code is selected, the segment application can present an updated segment attribute interface 215 as shown in the screenshot of FIG. 2C. The updated segment attribute interface 215 is similar to the segment attribute interface 200 of FIG. 2A. However, the updated segment attribute interface 215 presents the selected departure airport at the departure selector control 201. In this example, the creator selected the airport code "KFLL." If the creator decides to have the segment depart from a different airport, the creator can interact with (e.g., select) the departure selector control 201 and select a different airport code. Each time the creator selects an attribute for the s segment, the segment application can update the segment attribute interface to present the selected attributes.

If the creator interacts with the arrival selector control 202, the segment application can detect the interaction and present the arrival location interface 220 of FIG. 2D. Similar to the departure location interface 210 of FIG. 2B, the arrival location interface 220 includes a text entry box 221 that enables a creator to enter text for destination geographic location. In this example, the segment application identifies airport codes for airports that correspond to the text entered in the text entry box 221 and presents a list 222 of the airport codes along with information about each airport code (e.g., the city in which the airport is located).

In some implementations, the segment application can order the airport codes in the list 222 based on one or more criteria. In one example, the airport codes can be ordered in the list 222 based on an expected amount (e.g., estimated cost) for segments (e.g., charter segments) that arrive at the airport relative to an expected amount for segments that arrive from the other airports (e.g., airport codes for cheaper airports may be higher in the list 222 than the airport codes for more expensive airports). In another example, the airport codes can be ordered in the list 222 based on the frequency at which segments provided by the segment service provide arrive at the airports (e.g., airport codes for airports at which more segments arrive may be higher in the list 212 than airport codes for airports at which fewer segments arrive).

The creator can select, from the list 222, an airport code for a destination airport for the segment. The segment application can detect selection of an airport code and, in response, store data specifying the selected airport code for the segment. If the creator does not find the preferred airport in the list 222, the creator can adjust the text, e.g., by adding more text, deleting text, or replacing text, in the text entry box 221. The segment application can update the list 222 based on the updated text. Although a text entry box 222 is presented in the example arrival location interface 220, other interfaces can be used, such as voice input (e.g., the creator speaks the destination and the voice data is converted to text), a map interface in which a user selects the airport from a map, or other appropriate interface.

Figure 2F:
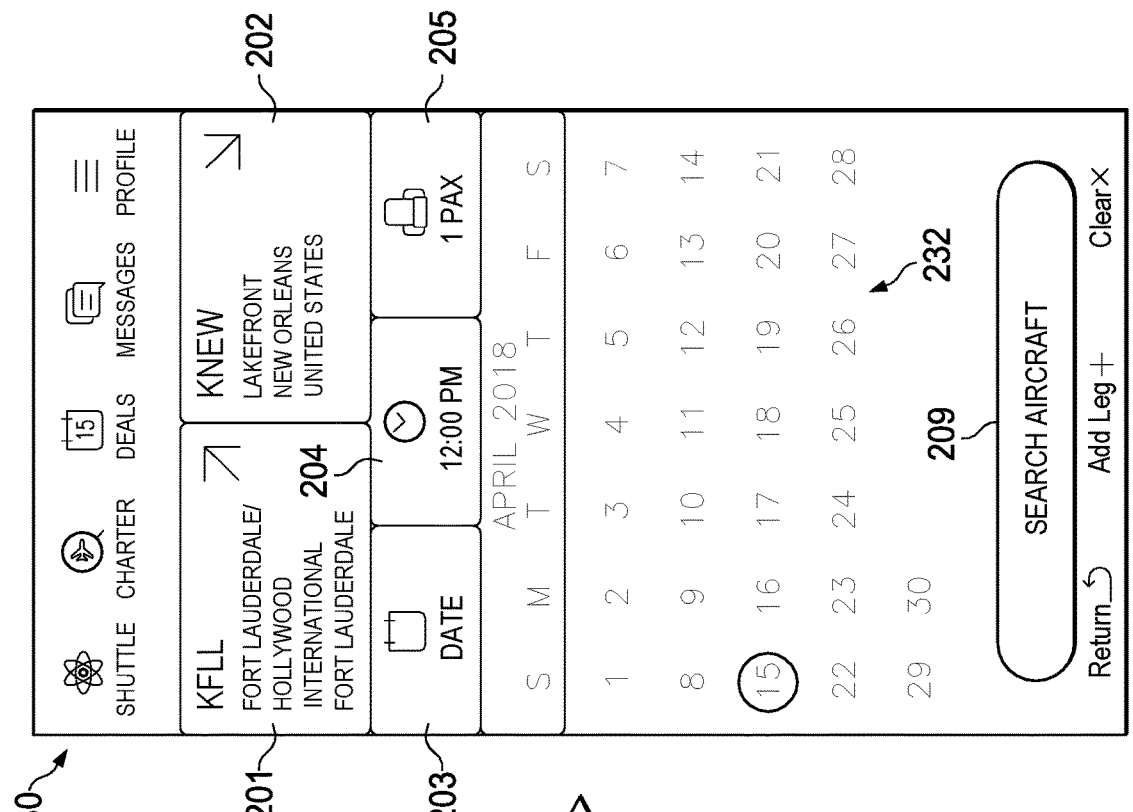
Figure 2E:
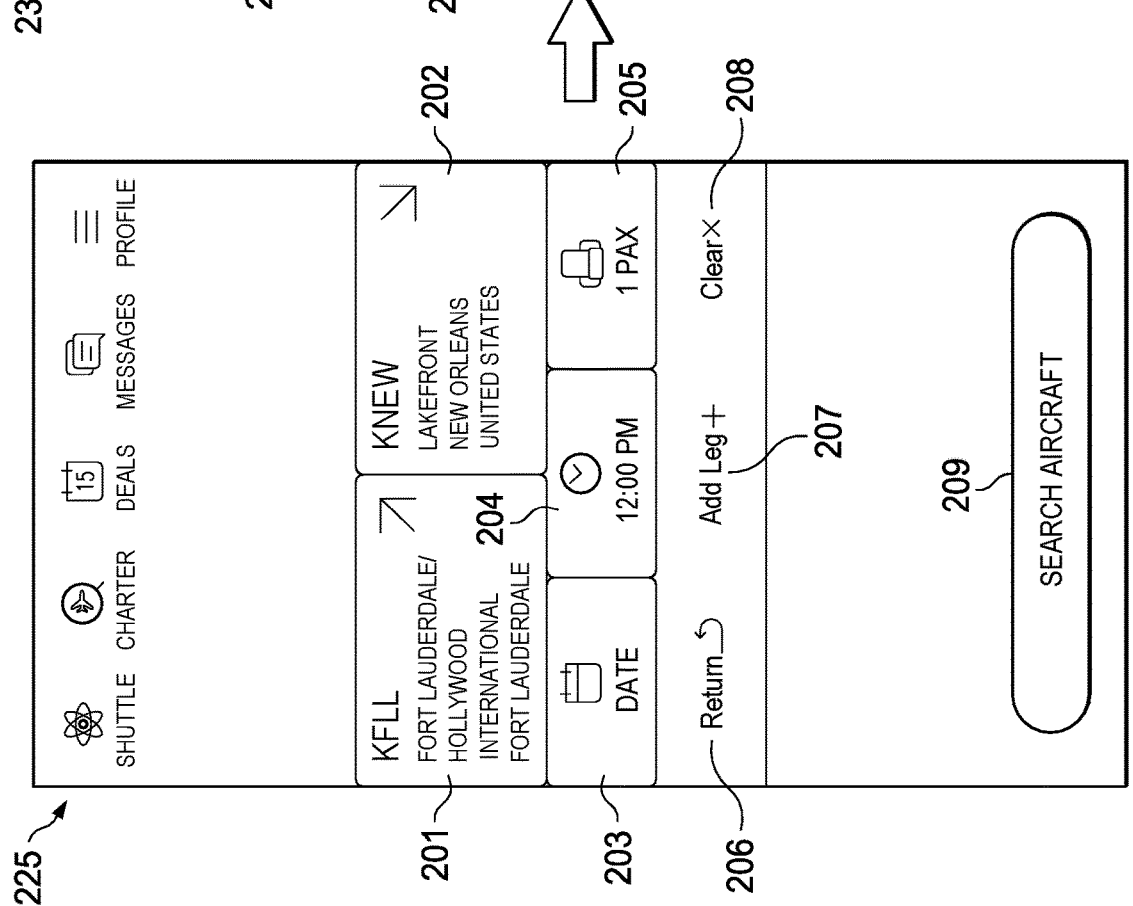
Figures 2I, 2J:
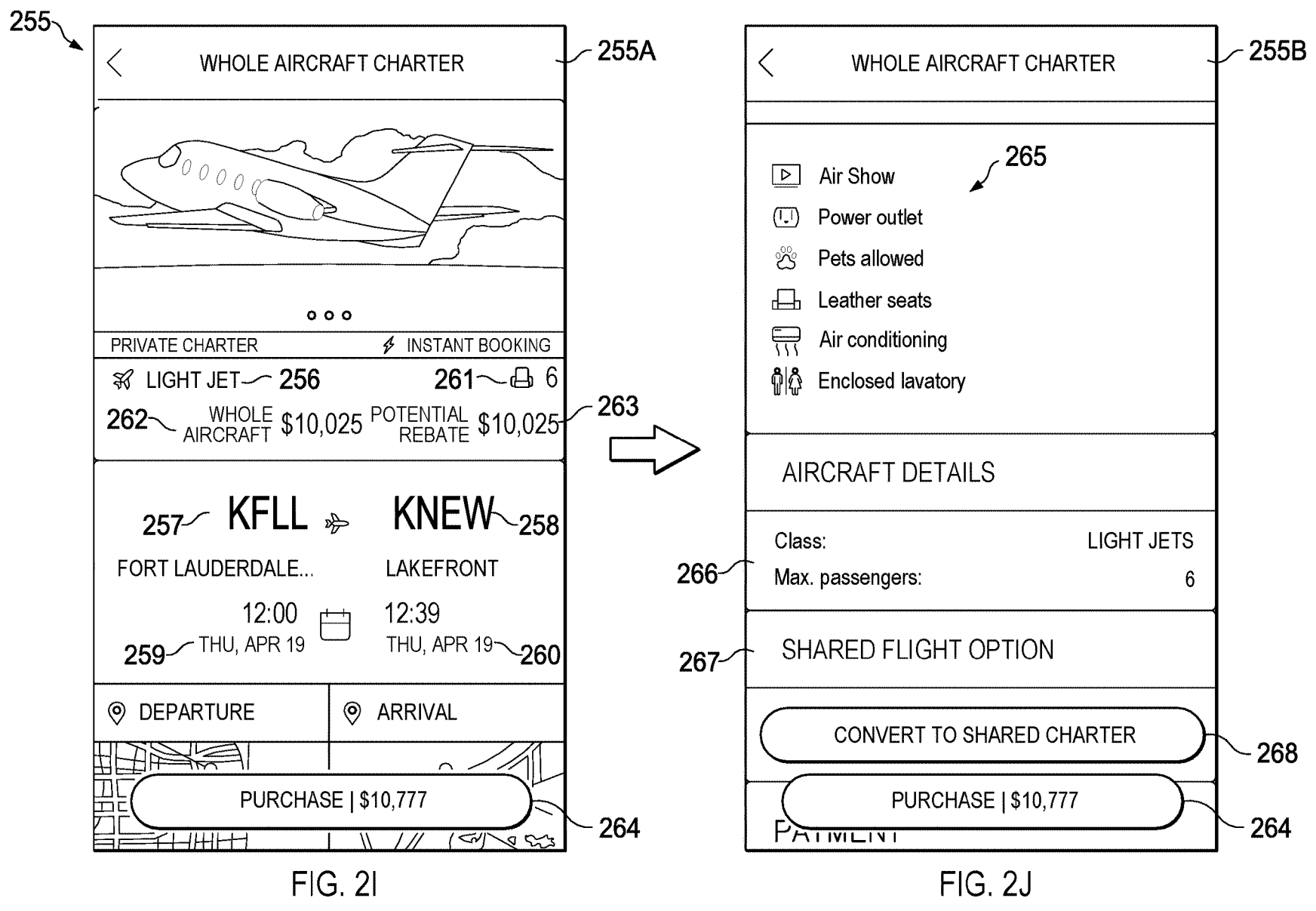

After a destination airport code is selected, the segment application can present an updated segment attribute interface 225 as shown in the screenshot of FIG. 2E. The updated segment attribute interface 225 is similar to the segment attribute interface 215 of FIG. 2C. However, the updated segment attribute interface 225 presents the selected destination airport at the arrival selector control 202 along with the selected departure airport at the departure selector control 201. In this example, the creator selected the airport code "KNEW" as the destination airport code. If the creator decides to have the segment arrive at a different airport, the creator can interact with (e.g., select) the arrival selector control 202 and select a different airport code.

If the creator interacts with the date selector control 203, the segment application can detect the interaction and update the segment attribute interface 225 to present an updated segment attribute interface 230 that includes a calendar date selector 232, as shown in the screenshot 230 of FIG. 2F. For example, the segment application can move the return segment segment selector control 206, the add leg selector control 207, and the clear control 208 down (or in another direction) in the updated segment attribute interface 230 to make room for the calendar date selector 232. In another example, the segment application can present the calendar date selector 232 over or in place of the return segment selector control 206, the add leg selector control 207, and the clear control 208. The creator can select a departure date for the segment by interacting with (e.g., selecting) the date in the calendar date selector 232.

After a departure date is selected, the segment application can present an updated segment attribute interface 235 as shown in the screenshot of FIG. 2G. The updated segment attribute interface 235 is similar to the segment attribute interface 225 of FIG. 2E. However, the updated segment attribute interface 235 presents the selected departure date at the date selector control 203 along with the selected destination airport at the arrival selector control 202 along with the selected departure airport at the departure selector control 201. In this example, the creator selected Apr. 19, 2018 as the departure date. If the creator decides to change the departure date, the creator can interact with (e.g., select) the date selector control 203 and select a different departure date.

In some implementations, the segment application can automatically select default values for the departure time and the minimum number of spots. In this example, the segment application uses a default of a 12:00 PM departure time and a default of at least one spot. The creator can change the departure time by interacting with the time selector control 204. Similarly, the creator can change the minimum number of spots by interacting with the number of spots selector control 205.

The segment application can activate the search aircraft control 209 as the attributes for the segment have been provided by the creator and/or default values have been provided by the segment application. For example, the segment application can evaluate the attributes for the segment specified by the creator. If the attributes required to identify or view jets for the segment have been specified, the segment application can activate the search aircraft control 209. If the creator interacts with the activated search aircraft control 209, the segment application can detect the interaction and present a jet selector interface 240, as shown in the screenshot of FIG. 2H.

The jet selection interface 240 presents jet information elements 241 and 245 for classes of jets available (or expected to be available) for the segment created by the creator. For example, the segment management system can identify jets that match the attributes specified by the creator and that have been used for segments that departed from the selected departure location (e.g., the airport represented by the selected departure airport code) and/or that arrived at the selected destination location (e.g., the airport represented by the selected destination airport code). The segment management system can then provide information about the classes of jets identified for the segment. If more than two classes of jets are available for the segment created by the creator, the creator can scroll down (or swipe up) in the jet selection interface 240 to view additional jet information elements for the additional jets.

The jet selection element 241 is for a light jet and includes a representative image of a light jet 242 (e.g., not an image of the actual jet that would be used for the segment) and information about the light jet. The information includes a number of spots 243 on the light jet, a total required submission 244 required to create a private segment using the light jet, and a potential credit 245 (e.g., rebate in this example) for enabling other clients to claim spots on the light jet. Similarly, the jet selection element 246 is for a midsize jet and includes a representative image 247 of a midsize jet and information about the heavy jet. The information includes a number of spots 248 on the midsize jet, a total required submission 249 required to create a private segment using the midsize jet, and potential credit 249 (e.g., rebate) for enabling other clients to claim spots on the midsize jet.

The creator can select one of the jet selection elements 241 or 246 to select the corresponding class of jet for the segment. If the creator selects one of the jet selection elements 241 or 246, the segment application can present a segment information interface 255 that presents information about the segment, as shown in the screenshot illustrated in FIG. 2I. In a first view 255A, the segment information interface 255 presents information that includes the selected class of jet 256 for the segment, the departure geographic identifier 257 (e.g., departure airport code) for the segment, the destination geographic identifier 258 (e.g., destination airport code), the departure date and time 259, the expected arrival date and time 260, a number of spots 261 on the segment, a total required submission 262 required to create the segment, and a potential credit 263 (e.g., rebate in this example) for enabling other clients to claim spots on the segment.

The segment information interface 250 also includes a purchase selector 264 that enables the creator to purchase the segment that the creator created. The segment application can detect user interaction with (e.g., selection of) the purchase selector 264 and, in response, create a client-initiated private segment that has the attributes specified by the creator.

The creator can interact with the segment information interface 255 to view additional information about the segment, as shown in the second view 255B. For example, the creator can scroll down (or swipe up) to view amenities 265 of the selected class of jet and details 266 of the selected class of jet (e.g., the selected class and the number of spots on the selected class of j et).

The second view 255B also includes a shared segment section 267 that includes a shared segment conversion control 268. The shared segment conversion control 268 enables the creator to convert the segment between a private segment (e.g., a private charter segment) and a shared segment (e.g., a shared charter segment). In this example, the creator has created a private segment using the interfaces of the segment application. If the creator interacts with the shared segment conversion control 268, the segment application can convert the private segment to a shared segment. In some implementations, the segment application converts the private segment to a shared segment by setting a shared segment flag or otherwise generating data that designates the segment as a shared segment. After converting to a shared segment, the creator can convert the shared segment back to a private segment by interacting with the shared segment conversion control 268. In some implementations, the segment application converts the shared segment back to a private segment by removing the shared segment flag or otherwise removing data that designates the segment as a shared segment. In some implementations, the option to convert the segment between private and shared can be removed by the segment application after a triggering event occurs. For example, the triggering event can be the creation of the segment being completed, e.g., after the creator purchases the segment, or a client claiming a spot on the shared segment. By removing the option to convert a shared segment back to a private segment, the segment application ensures that other clients who may have begun the process of claiming a spot on the shared segment can complete that process and so that the shared segment will still exist when other clients navigate to the interface to claim the spot. This prevents user dissatisfaction and potential application errors (e.g., application crashes) that may occur if the shared segment were removed (or changed to a private segment) after it is initially created or after a client has claimed a spot on the shared segment.

If the creator converts the segment to a shared segment, the segment application can present a spot selector interface 270 that enables the creator to select the number of spots (e.g., seats) the creator is claiming for occupancy by the creator and/or others, as shown in the screen shot illustrated in FIG. 2K. Any spot not claimed by the client can be claimed by other clients, e.g., other clients that receive a notification about the availability of the shared segment.

The spot selector interface 270 presents spot selector elements 271 that enable the creator to claim spots and release spots for use by other clients. The spot selector interface 270 can present a spot selector element 271 for each spot on the class of jet specified by the creator for the shared segment. In this example, the creator selected a light jet with six spots and the spot selector interface 270 presents six spot selector elements 271, one for each spot. The segment application can toggle a spot between a spot claimed by the creator and an available spot that can be claimed by other clients in response to user interaction with the spot selector element 271 for the spot. For example, if the spot is currently a claimed spot, interaction with the spot selector element 271 for the spot can cause the segment application to convert the spot to an available spot. Similarly, if the spot is currently an available spot, interaction with the spot selector element 271 for the spot can cause the segment application to convert the spot to a claimed spot for the creator.

The spot selector element 272 for a claimed spot may be presented differently from the spot selector element 273 for an available spot. For example, the segment application can present spot selector element 272 for a claimed spot in a different color (e.g., red) than the spot selector element 273 for an available spot (e.g., blue). Other visual characteristics can be used to differentiate between claimed spots and available spots, such as different shaped spot selector elements.

The spot selector element 272 for a claimed spot can also include the text "included" to indicate that the spot is included for the creator in the shared segment. The spot selector element 273 for an available spot can include an amount that will be credited to the creator if another client claims the available spot. In this example, the amount required to be submitted by the creator for the shared segment is 10,777 as indicated by the amount required element 274. The total potential amount that can be credited to the creator for spots claimed by other clients is 10,025, as indicated by the credit amount element 275.

In this example, the creator is required to claim at least one spot on the shared segment. The total potential amount that can be credited to the creator can be divided between the available spots, e.g., equally or in different amounts. In this example, the potential amount that can be credited for each spot is 2,005. For each spot claimed by another client, the creator can receive a credit of 2,005.

The total potential amount that can be credited to the creator can be based on the total required submission for the shared segment minus any taxes or other fees. In this example, the total required submission minus other fees may be 10,025 and thus, the total potential amount that can be credited to the creator is 10,025. The potential credit amount for each spot can be based on (e.g., equal to) the total potential amount that can be credited to the creator divided by the number of spots on the shared segment minus the one spot required for the creator. In this example, the potential credit amount for each spot is 2,005 (e.g., 10,025/5) as there are six spots on the shared segment minus the one spot for the creator.

In this example, the creator can offset the total required submission in credits if all of the other spots (other than the one required for the creator) are claimed by other clients. In other examples, the total potential amount that can be credited to the creator may be lower or higher than the total required submission for creating the segment.

The total potential amount that can be credited to the creator can change based on the number of spots claimed by the creator. If the creator claims a second spot on the shared segment, another client will not be able to claim the spot and the credit amount for the spot will not be available for the creator. For example, if the creator claims a second spot on the shared segment, the segment application can update the spot selector interface 270 to present the updated spot selector interface 280, as shown in the screenshot of FIG. 2L.

The updated spot selector interface 280 presents two spot selector elements 272 for claimed spots and four spot selector elements 273 for available spots. The updated spot selector interface 280 also presents an updated total potential amount that can be credited to the creator, as shown in the credit amount element 275. For example, the segment application can update the amount based on the number of spots claimed by the creator and present the updated amount in the credit amount element 275. This allows the creator to view in real time the total potential amount that can be credited to the creator based on the number of spots the creator is claiming.

In this example, the credit amount for each spot remains the same independent of the number of spots claimed by the creator on the shared segment. In other examples, the credit amount for each spot can vary based on the number of spots. For example, the credit amount for each spot can be increased with an increase in the number of spots claimed by the creator. In a particular example, the amount for each spot can be increased such that, if all available spots are claimed by other clients, the creator will receive the same total credit. In this example, the total potential amount that can be credited to the creator can remain constant, e.g., at 10,025. The credit amount for each spot can be equal to the total potential amount divided by the number of spots available. If two spots are claimed by the creator, the credit amount for each available spot can be 2,506 (e.g., 10,025/4).

After the creator claims the number of spots that the creator wants, the creator can select the purchase selector 264. In response, the segment application can transmit the attributes of the shared segment to the segment management system and the segment management system can create the client-initiated shared segment in the system. In addition, the segment management system can determine, based on the attributes, whether there are any available spots on the shared segment. If so, the segment management system can transmit notifications to clients other than the creator and enable the other clients to claim a spot on the shared segment.

Figure 3C:
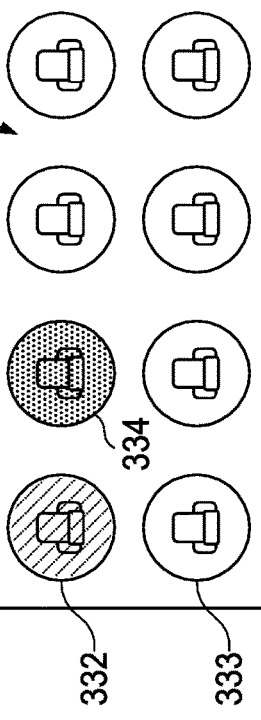

FIGS. 3A-3C are screenshots of example graphical interfaces for claiming a spot on a shared segment. The interfaces can be presented by an application, e.g., the segment application 132 of FIG. 1, executing on a client device, e.g., a client device 130 of FIG. 1.

FIG. 3A is a screenshot of an example notification interface 300 that presents notifications for segments (e.g., client-initiated shuttles, service provider scheduled shuttles, and shared segments) on which a client may be interested in claiming a spot. The segment application can present the notification interface 300 in response to user interaction with (e.g., selection of) a notifications selector control 310. For example, if the client wants to view notifications for special segments or shared segments (e.g., shared charter segments), the client can elect the notifications selector control 310.

In another example, the segment application can present the notification interface 300 in response to user interaction with a notification presented outside the application environment, e.g., when the segment application is an unlaunched state. For example, the device of the client can present a notification on the lock screen of the device or in a status bar of the device. The notification can present a portion of the information about a segment on which the client may be interested in claiming a spot (e.g., the origin and destination). When the device detects a user interaction with the notification, the device can launch the segment application and cause the segment application to present the notification interface 300.

The notification interface 300 presents segment notification elements 301 and 311. The segment information element 301 includes information about a segment on which the client may be interested in claiming a spot. The segment notification element 301 includes a representative image 302 of a turboprop for the segment, a segment type element 303 that indicates the type of the segment (a charter segment in this example), a segment details element 304 (e.g., departure geographic identifier, destination geographic indicator, actual jet used for the segment, and departure date and time), an available spots element 305 that indicates a number of spots available on the segment, and a required submission element 306 that indicates a required submission by the client to claim a spot on the segment.

Similarly, the segment notification element 311 includes information about another segment on which the client may be interested in claiming a spot. The segment information element 311 includes a representative image 312 of a jet for the segment, a segment type element 313 that indicates the type of the segment (an empty leg segment in this example), and a segment details element 304. Although not shown, the segment notification element 311 can also include an available spots element that indicates a number of spots available on the segment and required submission element that indicates a required submission by the client to claim a spot on the segment. When more than two segment notifications are available for the client, the segment application enables the client to scroll down (or swipe up) in the notification interface 300 to view additional segment notification elements.

When the client selects one of the segment notification elements, the segment application responds by presenting a spot claiming interface 320 that presents additional details about the segment represented by the selected segment notification element and enables the client to claim a spot on the segment. In this example, the client interacted with the segment notification element 301 and the segment details interface 320 includes additional details about the charter segment from West Palm Beach to Norman's Cay.

The spot claiming interface 320 includes similar information as the segment notification element 301 for the segment, e.g., the representative image 302, the segment details element 304, the available spots element 305, and the required submission element 306 that indicates a required submission by the client to claim a spot on the segment. The spot claiming interface 320 also includes an itinerary information element 321 that includes departure and arrival information and a purchase selector 322 that enables the client to claim a spot on the charter segment between West Palm Beach and Norman's Cay. The segment application can detect user interaction with the purchase selector 322 and, in response, reserve a spot for the client on the charter segment.

If the client wants to claim multiple spots on the charter segment, the client can scroll down (or swipe up) in the spot claiming interface 320 to view a spot selector interface 330. The spot selector interface 330 presents spot selector elements 331 for spots on the charter segment. In this example, the total number of spots on the charter segment is eight, with two spots still available. The spot selector element 332 for an available spot that can be presented differently from spot selector elements 333 for spots claimed by other clients and spot selector elements 334 for spots being claimed by the client that is currently viewing the spot selector interface 330 ("current client"). For example, the spot selector elements 332, 333, and 334 can be presented in different colors, different shapes, etc.

The segment application can toggle a spot that has not been claimed by another client between an available spot and a spot claimed by the current client in response to user interaction with the spot selector element 331 for the spot. For example, if the spot is currently an available spot, interaction with the spot selector element 331 for the spot can cause the segment application to convert the spot to a spot claimed by the current client. Similarly, if the spot is currently being claimed by the current client, interaction with the spot selector element 33 for the spot can cause the segment application to convert the spot to an available spot. The segment application can update the spot selector element for the spot based on the client interaction and its current status (e.g., claimed or available).

If the client claims a spot on a segment, the client may be required to provide a required submission for the spot. If the segment is a shared charter segment, the creator may receive a credit based on the claimed spot.

Figure 4:
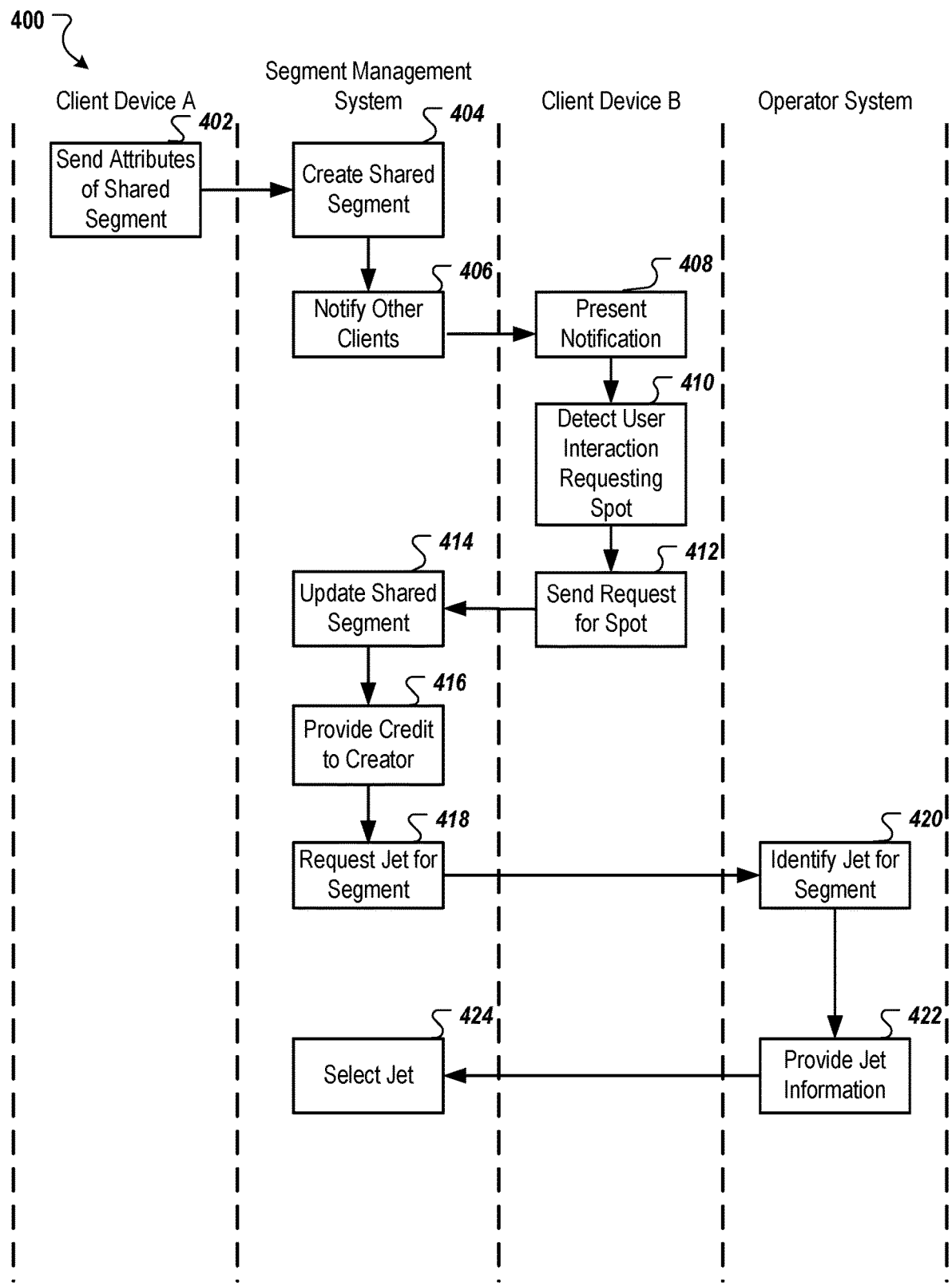
FIG. 4 is a swim lane diagram that illustrates an example process for creating a shared segment.

FIG. 4 is a swim lane diagram that illustrates an example process 400 for creating a shared segment (e.g., a shared charter segment). The operations of the process 400 are described with reference to the segment management system 110, the client device A 130-A, client device B 130-B, and the operator system 142 of FIG. 1.

The client device A 130-A sends attributes of a shared segment to the segment management system 110 (402). For example, a client associated with the client device A 130-A can initiate a private segment (e.g., a private charter segment) using the segment application 132. As discussed above, a client that initiates a segment is also referred to as a creator. The segment application 132 can enable the creator to specify attributes of the private segment. As described above, the attributes can include a departure geographic identifier, a destination geographic identifier, a departure date, and a type of jet.

The segment application 132 can also enable the creator to convert the private segment to a shared segment (e.g., a shared charter segment) on which other clients can claim a spot. If the creator converts the private segment to a shared segment, the segment application 132 can prompt the creator to specify the number of spots on the shared segment that the creator is claiming.

The segment management system 110 creates the shared segment based on the attributes received from the client device A 130-A (404). The segment management system can create the shared segment within the system and store the information for the created shared segment.

The segment management system notifies clients other than the creator that the shared segment created by the creator is available (406). For example, the segment management system 110 can send information about the shared segment to other clients that may be interested in claiming a spot on the shared segment. The segment scheduling engine 116 may send messages (e.g., within the application 132, via text messaging, and/or via e-mail) to the clients to notify the clients of the shared segment. As described below, the segment management system 110 can select clients to receive notifications for a client-initiated segment based on various factors.

The client device B 130-B receives the notification and presents information about the shared segment to the client associated with the client device B 130-B (408). If the notification is in the form of a message within the segment application 132, the segment application 132 executing on the client device B 130-B can present a message indicator that indicates that a new message has been received. The client can interact with the message indicator (e.g., select the message indicator) to open the message and view information about the segment. In some implementations, interaction with the message indicator or the message causes the segment application 132 to present an interface that enables the client to claim a spot on the shared segment, e.g., without being required to navigate to other interfaces within the segment application 132 to find the shared segment and then claim a spot on the shared segment.

The application 132 executing on the client device B 130-B detects a user interaction requesting a spot on the shared segment (410). For example, the client can select a spot on the segment while viewing information about the segment on an interface, e.g., the interface 330 of FIG. 3C.

The client device B 130-B sends the request for the spot to the segment management system 110 (412). The segment management system 110 receives the request and updates the shared segment (414). The segment management system 110 can update the shared segment to reflect the spot claimed by the client associated with the client device B 130-B. For example, the segment management system 110 can update the list of clients that are to travel on the segment and the number of spots claimed by the clients.

In some implementations, the segment management system 110 can determine whether all of the spots on the shared segment have been claimed by the creator and the other clients. If so, the segment management system can remove the notifications for the shared segment from the segment applications 132 of the other clients or notify the other clients that the shared segment is no longer available.

For each spot claimed by a client other than the creator, the segment management system provides a credit to the creator (416). As described above the credit can be in the form of flight credit (e.g., amounts that can be applied to the cost of future segments on which the creator joins or future segments that the creator creates), a refund, a discount, a reward (e.g., complementary future flight or upgrade to higher class jet), or other appropriate type of credit.

The segment management system 110 requests a jet for the shared segment (418). For example, the segment management system 110 can submit a request to the operator system 142 of one or more operators 140 for one of the operators to source a jet (and its crew) for the shared segment. The one or more operators can include operators that operate jets in the same geographic area (e.g., same city, state, or other appropriate geographic area) as the area from which the shared segment is scheduled to depart. The request can specify information about the shared segment, e.g., the type of jet requested, a minimum number of spots requested, the departure and destination identifiers for the shared segment, and/or other appropriate information that can be used by the operator system 142 to identify an appropriate jet for the shared segment.

Each operator system that receives the request identifies a jet for the shared segment (420). For example, the operator system 142 can access information about the operator's jets and compare the information in the request to the information about the operator's jets to identify a jet that is appropriate for the shared segment (e.g., a jet that is of the same type as specified by the request and includes the minimum number of spots). The operator system 142 can also access availability or scheduling information for the jets to ensure that the appropriate jet is available for the shared segment based on the departure date for the segment.

If the operator system 142 identifies an available jet that is appropriate for the shared segment, the operator system 142 provides information about the jet to the segment management system 110 (422). The information about the jet can include the number of spots on the jet, a cost for the segment, range of the jet, and/or other appropriate information. If operator systems for multiple operators provide information about an available jet, the segment management system 110 can select a jet for the segment based on the information provided by the operator systems 142 (424).

After selecting a jet, the segment management system 110 can notify the operator 140 of the selected jet. In turn, the operator system 142 of the operator 140 can provide a confirmed itinerary for the shared segment. The segment management system 110 can forward the itinerary to the creator that initiated the shared segment and the client(s) that claimed a spot on the shared segment, e.g., using message within the application 132.

Although operations 418-424 are illustrated as occurring after operations 406-416, these operations can be performed in different orders. The segment management system 110 can perform operations 418-424 in parallel with operations 406-416 or before operations 406-416. For example, the segment management system 110 may perform operations to source a jet for the shared segment in parallel with enabling clients to claim spots on the shared segment.

Figure 5:
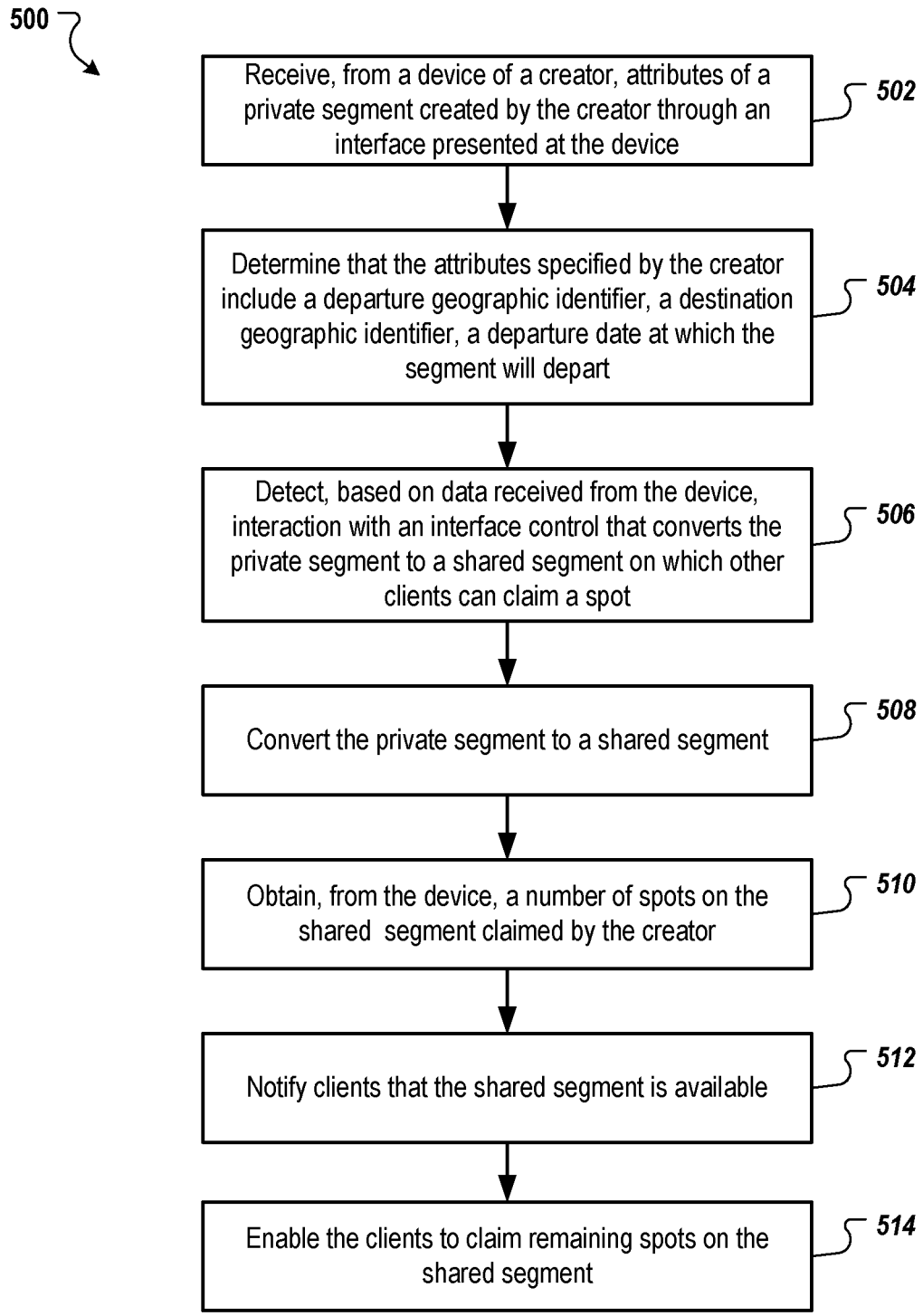
FIG. 5 is a flow chart of an example process for creating a shared segment.

FIG. 5 is a flow chart of an example process 500 for creating a shared segment. Operations of the process 500 can be performed, for example, by one or more data processing apparatus, such as the segment management system 110. Operations of the process 500 can also be implemented as instructions stored on a non-transitory computer readable medium. Execution of the instructions cause one or more data processing apparatus to perform operations of the process 500.

Attributes of a private segment (e.g., a private charter segment) are received (502). A creator can initiate a new private segment through one or more interfaces of presented at a device of the creator, e.g., by an application executing on the device. The creator can customize the private segment by specifying attributes of the private segment. The attributes can include, for example, a departure geographic identifier (e.g., an origin city or airport code), a destination geographic identifier (e.g., a destination city or airport code), a departure date (which can include a date and/or time) at which the segment will depart from the origin, and/or a type of jet (e.g., light, midsize, heavy, propeller, rotorcraft, etc.) for the private segment.

A determination is made that the attributes specified by the creator include a departure geographic identifier, a destination geographic identifier, and a departure date at which the private segment will depart (504). The interface(s) presented at the device can prompt the creator to provide the attributes. Once the attributes are obtained, the device can present additional interfaces, e.g., interfaces that enable the creator to specify a type of jet for the private segment and/or to convert the private segment to a shared segment (e.g., a shared charter segment) on which clients other than the creator can claim a spot.

Interaction with an interface control that converts the private segment to a shared segment is detected (506). The interaction can be detected based on data received from the device of the creator. For example, if the creator selects the interface control to convert the private segment to a shared segment, the device can provide data specifying the selection. In another example, after the creator selects a control to confirm (e.g., purchase) the segment, the device of the creator can provide data specifying the attributes of the segment and data specifying the type of segment (e.g., either private or shared).

The private segment is converted to a shared segment on which clients other than the creator can claim a spot in response to detecting the interaction with the interface control (508). As a shared segment, clients other than the creator can claim a spot if a spot is available.

A number of spots on the shared segment that are being claimed by the creator is obtained (510). For example, the device can prompt the creator to specify a number of spots being claimed by the creator on the shared segment in response to converting the private segment to a shared segment. The creator can then specify a number of spots being claimed, e.g., using an interface presented at the device. The number of spots may be limited, e.g., to at least one spot, but less than all of the spots.

After obtaining the number of spots on the shared segment being claimed by the creator, multiple different clients are notified that the shared segment created by the creator is available (512). As described above, the clients can be notified using push segment notifications, e.g., messages within a segment application, via text messaging, and/or via e-mail. The messages can include a link to an application page within a segment application (or to a web page in a web interface) to claim a spot on the segment. As described below, the multiple different clients can be selected based on various factors and may include less than all of the clients of a segment service.

The multiple different clients are enabled to claim a remaining spot on the shared segment (514). The clients can claim a spot that has not been claimed by the creator or another client. Enabling the clients to claim a spot can include allowing the clients to claim a spot on the shared segment through an interface of a client-side application, e.g., by providing a link to an interface (e.g., application page) that enables the client to claim a spot. For example, clients that were not sent a notification may not be enabled to claim a spot on the shared segment.

As described above, the client notification engine 124 of the segment management system 110 of FIG. 1 can transmit notifications to clients to notify the clients of the availability of client-initiated segments (e.g., client-initiated shuttles and/or client-initiated shared charters) and enable the clients to claim a spot on the client-initiated segments. The client notification engine 124 can select which clients are to be transmitted a notification for a client-initiated segment based on one or more factors, e.g., attributes of the client-initiated segment and/or membership data for the clients. By selectively notifying clients that are more likely to be interested in claiming a spot on each client-initiated segment, the clients are not overburdened with notifications for many (e.g., hundreds or more) segments in which the clients have little or no interest.

The notifications can allow a client to quickly and easily claim a spot on the client-initiated segment for which the notification was transmitted. For example, interaction with the notification may cause the client device to open the application and present a spot claiming interface that enables the client to claim a spot on the client-initiated segment by selecting a single interface control (e.g., a touchscreen icon). This prevents the client from having to navigate to multiple interfaces to find the segment and then claim a spot on the segment.

Figure 6:
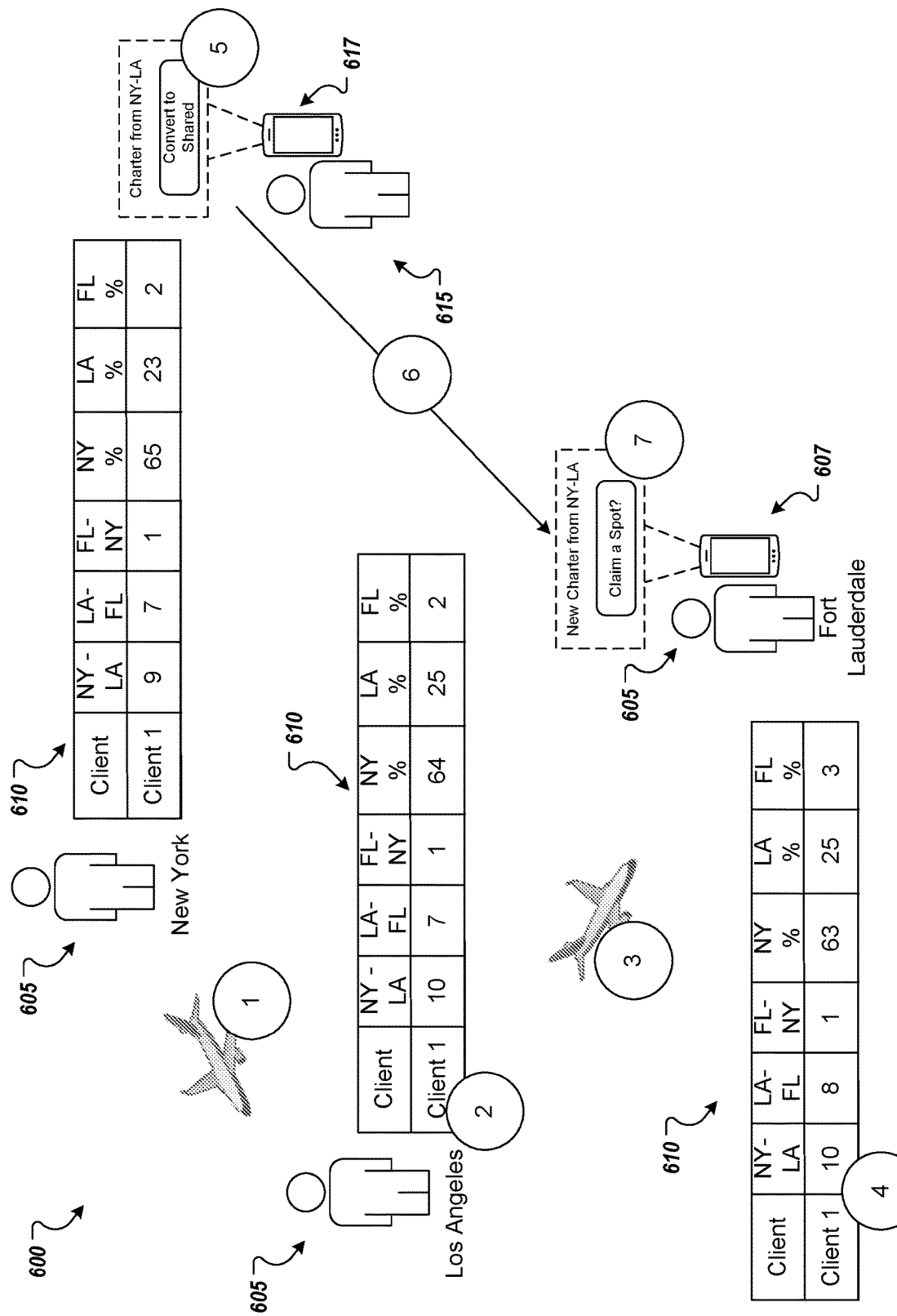
FIG. 6 depicts example sequence of events related to selecting a client to receive a notification that a client-initiated segment is available.

FIG. 6 depicts an example sequence of events 600 related to selecting a client 605 to receive a notification that a client-initiated segment is available. In the example of FIG. 6, during stage (1), a client 605 claims a spot (e.g., seat) on a segment and travels from New York City, NY to Los Angeles, CA Membership data 610 for the client 605 includes a number of times that client 605 has claimed a spot on segments along the route between locations New York City and Los Angeles (NY-LA), the route between Los Angeles and Fort Lauderdale (LA-FL), and the route between Fort Lauderdale and New York (FL-NY). The membership data 610 can also include similar data for other routes. The membership data 610 for the client 605 also includes a percentage of time that the client 605 has spent at each of New York City, Los Angeles, and Fort Lauderdale. In this example, prior to taking segment from New York City to Los Angeles, the client has spent 65% of time in the New York City area, 23% of time in the Los Angeles area, and 2% of time in the Fort Lauderdale area. The remaining 10% for the client can be spread over multiple other locations.

In stage (2), the membership data 610 for the client 605 is updated based on the spot claimed on the segment from New York City to Los Angeles (e.g., the count of the number of times the client 605 has claimed a spot on segments along the route between New York City and Los Angeles is updated from 9 to 10). The membership data 610 is also updated based on a two-night stay in Los Angeles (e.g., the percentage of time for New York City is updated to 64% and the percentage of time in Los Angeles is updated to 25%).

In stage (3), the client 605 claims a spot on a segment from Los Angeles to Fort Lauderdale. In stage (4), the membership data 610 is updated based on the spot claimed on the segment from Los Angeles to Fort Lauderdale (e.g., the count of the number of times the client 605 has claimed a spot on segments along the route between Los Angeles and Fort Lauderdale is updated from 7 to 8). The membership data 610 for the client 605 is also updated based on a one-night stay in Fort Lauderdale (e.g., the count of time for Fort Lauderdale is updated from 2% to 3%.

In stage (5), a creator 615 initiates a shared segment from New York City to Los Angeles using a device 617. The shared segment includes one or more available spots that clients other than the creator can claim. For example, the creator 615 can create a shared segment from New York City to Los Angeles and designate two spots on the shared segment as being available for other clients to claim (e.g., by not claiming the spots).

In stage (6) the segment management system notifies the client 605 that the created shared segment from New York City to Los Angeles is available. The segment management system 110 can determine, based on the membership data for other clients, to notify one or more of the other clients that the shared segment is available.

In some implementations, the client 605 is selected to receive a notification about available spots on the created shared segment from New York City to Los Angeles based on a frequency or number of times that the client 605 has claimed a spot on segments along the route between New York City and Los Angeles. In the example depicted in FIG. 6, the client 605 has claimed spots on segments between New York City and Los Angeles a total of 10 times. A client may be selected to receive a notification about a segment from New York City to Los Angeles if the client has claimed a spot on segments between New York City and Los Angeles at least a threshold number of times. In this example, if the threshold is 10 or less, the client 605 would receive a notification.

In some implementations, the client 605 is selected to receive a notification about available spots on the shared segment from New York City to Los Angeles based on New York City or Los Angeles being a home location of the client 605. In the example depicted in FIG. 6, the client 605 has spent 63% of the time in New York City, 25% of the time in Los Angeles, and 3% of the time in Fort Lauderdale. As described above, a geographic area may be a home location of a client if the client has spent at least a threshold percentage of time in the geographic area. In this example, if the threshold percentage is 25%, then New York City and Los Angeles would be home locations for the client 605 (with Los Angeles becoming a home location after the 2-night stay in stage 2). Thus, the membership data 610 for the client can be updated, e.g., in stage 2, to include Los Angeles as a home location identifier. An example process for selecting clients to receive a notification about the availability of a segment is described below with reference to FIG. 7 below.

In stage (7), a notification is presented at the device 607 of the client 605 The notification can include information about a number of available spots on the segment, times/dates of the segment, geographic location identifiers of the departure and destination geographic locations, and the like. The notification presented on the client device may include one or more actions available to the user (e.g., claim a spot or dismiss the notification).

FIG. 7 is a flow chart of an example process 700 for notifying clients of a client-initiated segment and enabling the clients to claim a spot on the client-initiated segment. Operations of the process 700 can be performed, for example, by one or more data processing apparatus, such as the segment management system 110. Operations of the process 700 can also be implemented as instructions stored on a non-transitory computer readable medium. Execution of the instructions cause one or more data processing apparatus to perform operations of the process 700. Although the process 700 is described in terms of client-initiated segments, the same or similar techniques can be used to notify clients of other types of segments.

Data specifying a client-initiated segment is received from a device of a creator (702). The data specifying the client-initiated segment can include a departure geographic identifier (e.g., an airport code for the departure airport), a destination geographic identifier (e.g., an airport code for the destination airport), and a number of spots being claimed by the creator (e.g., a number of seats occupied by the creator). For example, a creator may initiate a shared segment from KFLL in Fort Lauderdale, FL to KNEW in Lakefront, New Orleans, where the creator is claiming four spots on the shared segment for the creator and three others.

A number of available spots on the client-initiated segment that are available to be claimed by clients other than the creator is determined (704). The number of available spots can be determined, in part, based on the number of spots that are being claimed by the creator and a total number of available spots for the client-initiated segment. The number of available spots can depend on the type of aircraft, cargo, weather, and the like. For example, a total number of available spots for the flight can be six spots, and the creator has claimed four spots, leaving two spots available to be claimed by clients other than the creator.

A subset of clients can be created to transmit a notification of the client-initiated segment including a number of available spots is available (706). The subset of clients can include clients that have a set of one or more geographic identifiers (e.g., airport code, city, state, or regional area) that matches one or more of the departure geographic identifier or destination geographic identifier (e.g., airport code, city, state, country, or regional area) for the client-initiated segment.

A geographic identifier for a client can match a departure geographic identifier (or a destination geographic identifier) if the geographic identifier for the client corresponds to a geographic location that is within a threshold distance of a geographic location corresponding to the departure geographic identifier (or destination geographic identifier). For example, the threshold distance may be 25 miles, 50 miles, 100 miles, or another appropriate distance. If the client-initiated segment has a departure geographic identifier for an airport in Dekalb, GA and the one or more geographic identifiers for the client includes Atlanta, GA, the client may be selected to receive a notification for the client-initiated segment as Dekalb is with 25 miles of Atlanta. The geographic identifiers for a client can include client-specified location identifiers, home geographic identifiers, and/or other appropriate geographic identifiers.

The subset of clients can be a proper subset of a set of clients. For example, the set of clients can include all clients (e.g., members) of a service provided by a segment service provider. A proper subset of the set of clients includes at least one client but does not include all clients in the set.

In some implementations, a client can be selected for the subset of clients who receive a notification for a client-initiated segment based on a set of client-specified location identifiers (e.g., airport codes, city, state, country, or regional area) specified by the client as frequent locations for the client. The client can specify locations of interest, for example, locations that are frequent travel locations, locations that are frequent locations of residence, or locations to which the client has an interest in traveling.

The client can be selected for inclusion in the subset of clients if the client has specified a location identifier that corresponds to a geographic location that is within a threshold distance of a geographic location corresponding to the departure geographic or within a threshold distance of a geographic location corresponding to the destination geographic identifier. For example, a client can be selected to receive a notification for a shared segment between Atlanta, GA and West Palm Beach, FL if the client has specified West Palm Beach, FL and/or Atlanta, GA as frequent locations for the client. In another example, the client can be selected to receive a notification for a shared segment between Atlanta, GA and West Palm Beach, FL if the client has specified Hollywood, FL as a frequent location and Hollywood, FL is within the threshold distance of West Palm Beach, FL The threshold distance can be 25 miles, 50 miles, 100 miles, or another appropriate threshold.

In some implementations, a client can be selected for the subset of clients who receive a notification for a client-initiated segment based on a set of home location identifiers for the client. A home location identifier can correspond to a geographic location (e.g., a zip code, street address, city, state, regional area) where the client is determined to have spent at least a threshold percentage of their time. For example, the home location identifiers for a client can correspond to geographic areas at which a client spent at least 25% of their time over a specified time period, during the previous twelve months.

The client can be determined to have spent at least a threshold percentage of the client's time in a particular geographic area using, for example, location data provided by a device belonging to the client. For example, Washington, D.C. can be classified as a home location identifier for the client if the location data for the client indicates that the client has spent at least the threshold percentage of time in the Washington, D.C. metro area during the previous twelve months.

In some implementations, a client can be selected for the subset of clients who receive a notification of a client-initiated segment based on a number of times that the client has viewed information for one or more routes (e.g., through segment application 132) that include at least one of a departure geographic identifier and/or a destination geographic identifier for the client-initiated segment. The segment management system 110 can track routes that are presented to the client through the segment application 132 and a number of times that the client views a particular route or segments on the particular route. For example, a client may be included in the subset of clients to receive a notification of a shared segment from New York City, NY to Miami Beach, FL if the client has viewed information related to routes from New York City, NY to Miami Beach, FL at least a threshold number of times, e.g., at least ten times.

In some implementations, a client can be selected for the subset of clients who receive a notification of a client-initiated segment based on a threshold number of times that the client has performed a search (e.g., submitted a query through the segment application 132) for information related to one or more routes that include a departure geographic identifier and/or a destination geographic identifier for the client-initiated segment. For example, a client may be included in the subset of clients to receive a notification of a shared segment from New York City, NY to Miami Beach, FL if the client has searched (e.g., through the segment application 132) for information related to routes between New York City, NY and Miami Beach, at least a threshold number of times.

In some implementations, a client can be selected for the subset of clients who receive a notification of a client-initiated segment based on a number of times that the client has claimed a spot on segments between geographic locations corresponding to the departure geographic identifier and the destination geographic identifier of the client-initiated segment. For example, a client may be included in the subset of clients to receive a notification of a shared segment between New York City, NY and Miami Beach, FL if the client has claimed spots (e.g., through the segment application 132) on routes between New York City, NY and Miami Beach, FL at least a threshold number of times.

A notification is transmitted to each client in the subset of clients, alerting the client of the available client-initiated segment (708). The notification can be provided, for example, in a segment application 132 of a device of the client). The notification may include information detailing the departure geographic identifier, the destination geographic identifier, a number of available spots on the client-initiated segment, and/or an itinerary (e.g., departure/arrival times and dates) of the client-initiated segment. In some implementations, the notification may include information detailing the aircraft of the client-initiated segment (e.g., model, class, year of make), a required submission to claim a spot on the client-initiated segment, or other appropriate information regarding the client-initiated segment.

Responsive to receiving the notification, each client in the subset of clients is enabled (e.g., through the segment application 132) to claim a spot on the client-initiated segment using a client-side application (710). For example, a client may receive a notification about a client-initiated segment between West Palm Beach, FL and Norman's CAY, Bahamas including four available spots and select through the segment application to request (e.g., reserve) two spots on the client-initiated segment.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by a segment service provider and from a client device of a creator client, data indicating attributes of a proposed segment;
creating, by the segment service provider, a new client-initiated segment using the attributes of the proposed segment based on the segment service provider not having an existing segment matching the attributes of the proposed segment;
converting, by the segment service provider, the new client-initiated segment into a shared client-initiated segment, thereby enabling third parties to request, through an application provided by the segment service provider, spots on the new client-initiated segment that were not claimed by the creator client;
identifying, from a set of clients, a subset of clients that are determined to be likely to claim one or more available spots on the shared client-initiated segment;
transmitting, to each client in the subset of clients, data indicating that a spot is available to claim on the shared client-initiated segment;
receiving, from a client device of at least one client of the subset of clients, a request to claim one or more available spots on the shared client-initiated segment;
generating a request that comprises data representative of the shared client-initiated segment;

transmitting the request to a plurality of jet operators for operating a jet to complete the shared client-initiated segment;

receiving, from each of one or more jet operators of the plurality of jet operators, data indicating one or more attributes of a jet for the shared client-initiated segment, the one or more attributes for the jet comprising an identifier of the jet; and selecting, from the one or more jet operators, a given jet that will transport the client creator on the shared client-initiated segment using the one or more attributes of each jet.

2. The computer-implemented method of claim 1, further comprising:

for each spot claimed by a client of the subset of clients: providing data indicative of a credit to be applied to the creator client.

3. The computer-implemented method of claim 1, wherein the data indicating attributes of the proposed segment comprises a departure geographic identifier, a destination geographic identifier, a departure date, and a type of jet being requested for the proposed segment.

4. The computer-implemented method of claim 1, wherein identifying the subset of clients that are determined to be likely to claim the one or more available spots on the shared client-initiated segment further comprises:

determining a number of times a given client has claimed a spot on a segment between a first geographic location that corresponds to a departure geographic identifier and a second geographic location that corresponds to a destination geographic identifier;

determining the number of times satisfies a threshold; and in response to determining that the number of times satisfies the threshold, including the given client in the subset of clients.

5. The computer-implemented method of claim 1, wherein identifying the subset of clients that are determined to be likely to claim the one or more available spots on the shared client-initiated segment further comprises identifying, for each client in the set of clients, a number of times the client has selected, using an application, to obtain segment information for one or more routes that include at least one of a departure geographic identifier for the shared client-initiated segment or a destination geographic identifier for the shared client-initiated segment.

6. The computer-implemented method of claim 5, wherein identifying, for each client in the set of clients, the number of times the client has selected, using the application, to obtain the segment information comprises determining a number of times each client has selected to view segment information for the one or more routes that include at least one of the departure geographic identifiers for the shared client-initiated segment or the destination geographic identifier for the shared client-initiated segment.

7. The computer-implemented method of claim 5, wherein identifying, for each client in the set of clients, the number of times the client has selected, using the application, to obtain the segment information comprises determining a number of times each client has searched for information for one or more routes that include at least one of the departure geographic identifier for the client-initiated segment or the destination geographic identifier for the shared client-initiated segment.

8. The computer-implemented method of claim 1, further comprising:

receiving, from the creator, criteria for selecting the subset of clients from the set of clients that are likely to claim the one or more available spots on the shared client-initiated segment, the method further comprising:

filtering, using the received criteria and from the set of clients, one or more clients that are not eligible to claim the one or more available spots on the shared client-initiated segment, wherein the criteria comprises at least one of (i) a client opting out from notification, (ii) a client having a specific allergy to a particular animal, or (iii) a client specifying a type of animal for transport on segments.

9. The computer-implemented method of claim 1, further comprising:

determining whether all of the available spots on the shared client-initiated segment have been claimed by the creator and the subset of clients; and in response to determining that all of the available spots on the shared client-initiated segment have been claimed, (i) removing, from a user interface, data indicative of the client-initiated segment to prevent other clients from claiming a spot on the shared client-initiated segment and/or (ii) transmitting a notification to the other clients indicating that the shared client-initiated segment is no longer available.

10. The computer-implemented method of claim 1, wherein transmitting the data to each client of the subset of clients indicating that the spot is available to claim on the shared client-initiated segment further causes a client device associated with a client to display a calendar interface, wherein the calendar interface displays, for each date, zero or more segment indicators for each segment scheduled to travel from an origin to a destination on that date.

11. The computer-implemented method of claim 10, wherein the calendar interface displayed on each client device displays similar information related to each client-initiated segment.

12. The computer-implemented method of claim 1, wherein identifying the subset of clients that are determined to be likely to claim the one or more available spots on the shared client-initiated segment further comprises:

identifying, for a given client, a set of one or more client-specified location identifiers specified by the client as frequent locations for the client; and determining that at least one of the one or more client-specified location identifiers corresponds to a geographic location that is (i) within a threshold distance of a geographic location corresponding to a departure geographic identifier of the shared client-initiated segment or (ii) within the threshold distance of a geographic location corresponding to a destination geographic identifier of the shared client-initiated segment and, in response, including the given client in the subset of clients.

13. The computer-implemented method of claim 1, wherein identifying the subset of clients that are determined to be likely to claim the one or more available spots on the shared client-initiated segment further comprises:

identifying, for a given client, a set of one or more home location identifiers for the client; and determining that at least one of the one or more home location identifiers corresponds to a geographic location that is (i) within a threshold distance of a geographic location corresponding to a departure geographic identifier of the shared client-initiated segment or (ii) within the threshold distance of a geographic location corresponding to a destination geographic identifier of the client initiated segment and, in response, including the given client in the subset of clients.

14. The computer-implemented method of claim 1, wherein identifying the subset of clients that are determined to be likely to claim the one or more available spots on the shared client-initiated segment further comprises:
identifying, using location data provided by a device of a given client, geographic areas at which the given client spent time;
determining, for each geographic area at which the given client spent time, a respective percentage of time the client spent in the geographic area; and
for each geographic area for which the respective percentage of time satisfies a percentage of time, classifying a location identifier for the geographic area as a home location identifier for the given client.

15. The computer-implemented method of claim 1, wherein selecting the given jet for the shared client-initiated segment using the one or more attributes of each jet further comprises:
selecting, from the one or more jet operators, the given jet for the shared client-initiated segment based on the one or more attributes of each jet and previous jets used for prior client-initiated segments that have criteria that match to the shared client-initiated segment.

16. A system comprising:
one or more computers and one or more storage devices storing instructions that are operable, when executed by the one or more computers, to cause the one or more computers to perform operations comprising:
receiving, by a segment service provider and from a client device of a creator client, data indicating attributes of a proposed segment;
creating a new client-initiated segment using the attributes of the proposed segment based on the segment service provider not having an existing segment matching the attributes of the proposed segment;
converting, by the segment service provider, the new client-initiated segment into a shared client-initiated segment, thereby enabling third parties to request, through an application provided by the segment service provider, spots on the new client-initiated segment that were not claimed by the creator client;
identifying, from a set of clients, a subset of clients that are determined to be likely to claim one or more available spots on the shared client-initiated segment;
transmitting, to each client in the subset of clients, data indicating that a spot is available to claim on the shared client-initiated segment;
receiving, from a client device of at least one client of the subset of clients, a request to claim one or more available spots on the shared client-initiated segment;
generating a request that comprises data representative of the shared client-initiated segment;
transmitting the request to a plurality of jet operators for operating a jet to complete the shared client-initiated segment;
receiving, from each of one or more jet operators of the plurality of jet operators, data indicating one or more attributes of a jet for the shared client-initiated segment, the one or more attributes for the jet comprising an identifier of the jet; and
selecting, from the one or more jet operators, a given jet that will transport the client creator on the shared client-initiated segment using the one or more attributes of each jet.

17. The system of claim 16, further comprising:
for each spot claimed by a client of the subset of clients:
providing data indicative of a credit to be applied to the creator client.

18. The system of claim 16, wherein the data indicating attributes of the proposed segment comprises a departure geographic identifier, a destination geographic identifier, a departure date, and a type of jet being requested for the proposed segment.

19. The system of claim 16, wherein identifying the subset of clients that are determined to be likely to claim the one or more available spots on the shared client-initiated segment further comprises:
determining a number of times a given client has claimed a spot on a segment between a first geographic location that corresponds to a departure geographic identifier and a second geographic location that corresponds to a destination geographic identifier;
determining the number of times satisfies a threshold; and
in response to determining that the number of times satisfies the threshold, including the given client in the subset of clients.

20. A non-transitory computer-readable medium storing software comprising instructions executable by one or more computers which, upon such execution, cause the one or more computers to perform operations comprising:
receiving, by a segment service provider and from a client device of a creator client, data indicating attributes of a proposed segment;
creating a new client-initiated segment using the attributes of the proposed segment based on the segment service provider not having an existing segment matching the attributes of the proposed segment;
converting, by the segment service provider, the new client-initiated segment into a shared client-initiated segment, thereby enabling third parties to request, through an application provided by the segment service provider, spots on the new client-initiated segment that were not claimed by the creator client;
identifying, from a set of clients, a subset of clients that are determined to be likely to claim one or more available spots on the shared client-initiated segment;
transmitting, to each client in the subset of clients, data indicating that a spot is available to claim on the shared client-initiated segment;
receiving, from a client device of at least one client of the subset of clients, a request to claim one or more available spots on the shared client-initiated segment;
generating a request that comprises data representative of the shared client-initiated segment;
transmitting the request to a plurality of jet operators for operating a jet to complete the shared client-initiated segment;
receiving, from each of one or more jet operators of the plurality of jet operators, data indicating one or more attributes of a jet for the shared client-initiated segment, the one or more attributes for the jet comprising an identifier of the jet; and
selecting, from the one or more jet operators, a given jet that will transport the client creator on the shared client-initiated segment using the one or more attributes of each jet.

* * * * *